(12) United States Patent
Sanma et al.

(10) Patent No.: US 8,982,067 B2
(45) Date of Patent: Mar. 17, 2015

(54) OPERATION INPUT DEVICE AND METHOD FOR CONTROLLING THE SAME

(75) Inventors: Norio Sanma, Okazaki (JP); Kunihiro Nakagawa, Anjo (JP); Koji Tamai, Nagoya (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 163 days.

(21) Appl. No.: 13/443,150

(22) Filed: Apr. 10, 2012

(65) Prior Publication Data

US 2012/0262394 A1 Oct. 18, 2012

(30) Foreign Application Priority Data

Apr. 13, 2011 (JP) ................................. 2011-088784

(51) Int. Cl.
```
G06F 3/041     (2006.01)
G06F 3/045     (2006.01)
G09G 3/36      (2006.01)
G06F 3/044     (2006.01)
G06F 3/01      (2006.01)
```

(52) U.S. Cl.
CPC ...................................... *G06F 3/016* (2013.01)
USPC ..................... 345/173; 178/18.03; 178/18.05; 178/18.06; 345/104; 345/174

(58) Field of Classification Search
CPC ......... G06F 3/041; G06F 3/045; G06F 3/042; G06F 3/043
USPC ............. 345/173–178, 104; 178/18.03–18.07
See application file for complete search history.

(56) References Cited

U.S. PATENT DOCUMENTS

| 7,109,967 B2 | 9/2006 | Hioki et al. |
| 2006/0119586 A1* | 6/2006 | Grant et al. .................... 345/173 |
| 2009/0128503 A1* | 5/2009 | Grant et al. .................... 345/173 |
| 2010/0156814 A1 | 6/2010 | Weber et al. |

(Continued)

FOREIGN PATENT DOCUMENTS

| JP | 2003-058321 | 2/2003 |
| JP | 2004-046792 | 2/2004 |

(Continued)

OTHER PUBLICATIONS

Office action dated Apr. 19, 2013 in corresponding Japanese Application No. 2011-088784.

(Continued)

*Primary Examiner* — Lun-Yi Lao
*Assistant Examiner* — Jarurat Suteerawongsa
(74) *Attorney, Agent, or Firm* — Harness, Dickey & Pierce, PLC

(57) ABSTRACT

A touch operation unit has a manipulated surface accepting a touch operation. An operation detection unit detects a touch operation on the manipulated surface. A moving unit moves the touch operation unit. A movement control unit drives the moving unit to control a movement of the touch operation unit, when the operation detection unit detects a touch operation, to satisfy a predetermined stimulable condition enabling stimulation of a skin sensory receptor. The stimulable condition is a condition of a movement quantity of the touch operation unit and a moving speed of the touch operation unit or a condition of the movement quantity of the touch operation unit and an acceleration of the touch operation unit.

23 Claims, 10 Drawing Sheets

(56) References Cited

U.S. PATENT DOCUMENTS

| | | |
|---|---|---|
| 2010/0207895 A1* | 8/2010 | Joung et al. .................. 345/173 |
| 2012/0154330 A1 | 6/2012 | Shimizu |
| 2012/0194460 A1 | 8/2012 | Kuwabara et al. |

FOREIGN PATENT DOCUMENTS

| | | |
|---|---|---|
| JP | 2004-058695 | 2/2004 |
| JP | 2011-048692 | 3/2011 |
| JP | 2011-048701 | 3/2011 |
| JP | 2011-070600 | 4/2011 |

OTHER PUBLICATIONS

Office action dated Sep. 22, 2014 in corresponding Chinese Application No. 201210109394.5.

* cited by examiner

LATERAL/HORIZONTAL DIRECTION

| MODE | MOVEMENT PARAMETER |
|---|---|
| NORMAL MODE | P23 |
| SPORT MODE | P11 |
| MALE MODE | P12 |
| FEMALE MODE | P24 |
| ⋮ | ⋮ |

T1: CONTACT AREA: y2

T2: CONTACT AREA: y2, x2

T3: CONTACT AREA: y2, y3, x2

OPERATION INPUT DEVICE AND METHOD FOR CONTROLLING THE SAME

CROSS REFERENCE TO RELATED APPLICATIONS

This application is based on reference Japanese Patent Application No. 2011-88784 filed on Apr. 13, 2011, the disclosure of which is incorporated herein by reference.

TECHNICAL FIELD

The present disclosure relates to an operation input device configured to accept a touch operation. The present disclosure relates to a method for controlling the operation input device.

BACKGROUND

In recent years, touch panels are increasingly employed in operation input devices in use of, for example, electronic equipments. In the automobile field, it is conceivable that mechanical switch devices equipped to instrument panels for operating airconditioner apparatuses and navigation devices are to be replaced with touch sensors in future. Conventionally, it is difficult to cause an operation feeling, such as a click feeling, on existing touch panels and existing touch sensors, in response to a touch operation thereto. Accordingly, further amenity and certainty are demanded in operation of such devices. More specifically, in an operation input device including, for example, a touch panel configured to accept a touch operation thereto, it is demanded to apply a tactile feeling (tactile feedback) in response to a touch operation in order to enhance its operability.

For example, US 2010/0156814 A1 (JP-A-2010-152889) discloses a portable electronic device including a touch detection display. The portable electronic device of US 2010/0156814 A1 moves the touch detection display in response to a touch operation thereby to provide a tactile feedback. Specifically, the touch detecting display is movable relative to the housing, and the rear side of the touch detecting display is equipped with a piezoelectric actuator. Furthermore, in response to the touch operation, the piezoelectric actuator controls movement of the touch detecting display in the vertical direction according to the external force applied to the touch detecting display, thereby to simulate depression and release of a switch device.

For example, JP-A-2003-58321 discloses a touch panel device configured to oscillate its touch panel in the two-dimensional direction along its screen surface in various vibration patterns, when receiving a touch operation, thereby to provide various kinds of information to an operator with a tactile sense through the touch-panel screen. Specifically, the touch panel device of JP-A-2003-58321 includes a horizontal direction moving unit for moving the touch panel in the horizontal direction of the screen and a vertical direction moving unit for moving the touch panel in the vertical direction of the screen. The touch panel device of JP-A-2003-58321 controls the timing, when activating the horizontal direction moving unit and the vertical direction moving unit, and the moving speed and the movement (movement quantity) of the horizontal direction moving unit and the vertical direction moving unit, thereby to generate various vibration patterns.

JP-A-2004-58695 discloses a vibration device configured to cause a vibration, when receiving a touch operation, in an optimal vibration pattern including its acceleration and its frequency to cause a user to sense the vibration and not to feel discomfort.

In consideration of requirement of the operation performance of the touch-sensing operation input device in future, it is conceivable to simulate a tactile feeling further accurately when a mechanical switch device is operated. Specifically, it is conceivable to simulate a tactile feeling in consideration of a hardness of a switch device, such as a switch device of hard tactile feeling and a switch device of soft tactile feeling. Each of the above-described arts in US 2010/0156814 A1, JP-A-2003-58321, and JP-A-2004-58695 is configured to apply a tactile feeling in response to a touch operation. Nevertheless, each of these arts does not have a configuration to apply a tactile feeling in consideration of the hardness of a switch device. Therefore, the conventional configuration may apply an unexpected tactile feeling, such as a hard tactile feeling with respect to user's expectation of a soft tactile feeling.

SUMMARY

It is an object of the present disclosure to produce an operation input device configured to apply a tactile feeling (operation feeling) in consideration of hardness and softness when accepting a touch operation. It is another object of the present disclosure to produce a method for controlling the operation input device.

The present inventors found out that the skin sensory receptor, such as the Meissner's corpuscle and the Pacinian corpuscle, can be stimulated in a condition where a skin, such as a user's finger, is in contact with an object and when the amount of slide of the skin (movement of the skin in the horizontal direction of the object) and the moving speed or the acceleration, which is the momentary change of the moving speed, satisfy a predetermined condition. Furthermore, the present inventors found out change in the value of the movement (movement quantity) of the skin and change in the value of the moving speed or the acceleration enables application of the tactile feeling being distinct in hardness.

In consideration of the present inventors' finding, according to an aspect of the present disclosure, an operation input device comprises a touch operation unit having a manipulated surface configured to accept a touch operation. The operation input device further comprises an operation detection unit configured to detect a touch operation on the manipulated surface. The operation input device further comprises a moving unit configured to move the touch operation unit. The operation input device further comprises a movement control unit configured to drive the moving unit to control a movement of the touch operation unit, when the operation detection unit detects a touch operation, to satisfy a predetermined stimulable condition enabling stimulation of a skin sensory receptor, the stimulable condition being: a condition of a movement quantity of the touch operation unit and a moving speed of the touch operation unit; or a condition of the movement quantity of the touch operation unit and an acceleration of the touch operation unit.

According to another aspect of the present disclosure, a method for controlling an operation input device, the method comprises detecting a touch operation implemented on a manipulated surface of the operation input device. The method further comprises driving, on detection of a touch operation in the detecting, a moving unit of the operation input device to move the touch operation unit and to control a movement of the touch operation unit to satisfy a predetermined stimulable condition enabling stimulation of a skin sensory receptor, the stimulable condition being: a condition of a movement quantity of the touch operation unit and a moving speed of the touch operation unit; or a condition of the movement quantity of the touch operation unit and an acceleration of the touch operation unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

Figure 1:
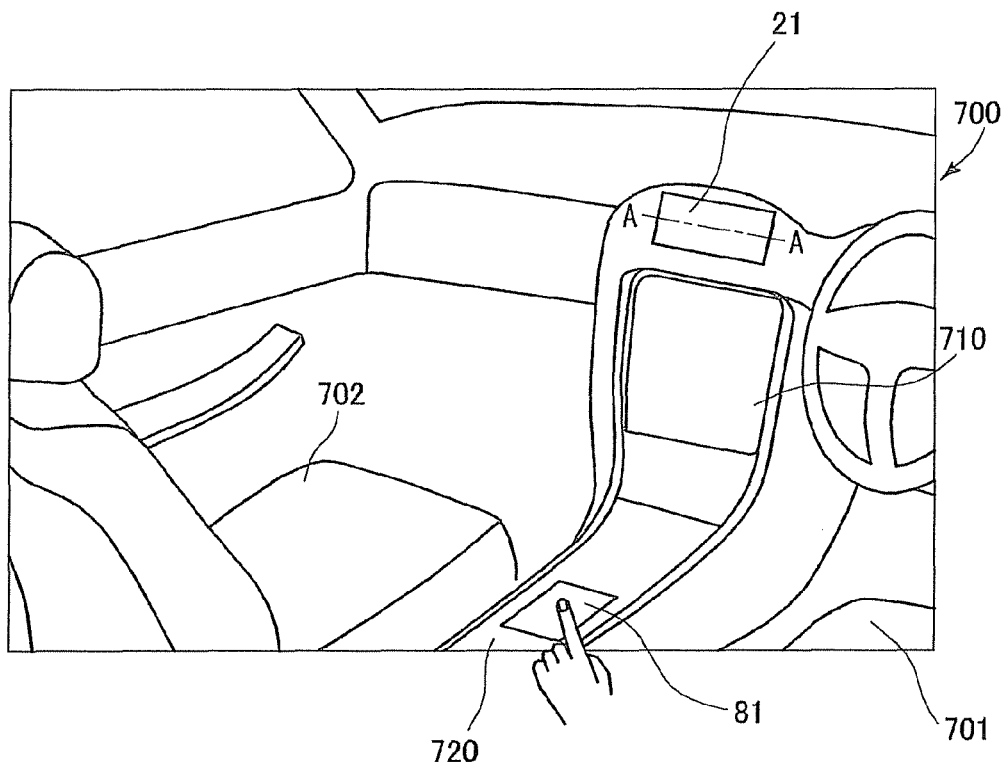
FIG. 1 is a view showing a vehicle compartment.

As follows, the first embodiment of an operation input device will be described with reference to drawings. According to the present embodiment, the operation input device is employed for providing an instruction to operate a vehicular device equipped to a vehicle. FIG. 1 shows a vehicle interior 700 equipped with the operation input device of the present embodiment. As shown in FIG. 1, a center console 720 is provided between a driver's seat 701 and a passenger's seat 702. A center panel part 710 is equipped on the front side of the center console 720 and is opposed to a front seat area. The center panel part 710 is equipped with a switch device (not shown) for providing an instruction to operate various kinds of vehicular devices. Specifically, the center panel part 710 is equipped with configuration switch devices for an airconditioner, which is one example of a vehicular device, such as a temperature configuration switch, a wind volume configuration switch, and a wind direction configuration switch. These switch devices may include a push switch device, which is operated when being depressed, and/or a rotary switch device, which is operated when being rotated.

The upper portion of the center panel part 710 is equipped with a liquid crystal display 21 (display device) for a navigation device, which is one example of a vehicular device. The display device 21 is in a rectangular shape in its front view. The horizontal direction of the display device 21 is along the width direction of the vehicle. The vertical direction of the display device 21 is along the vertical direction of the center panel part 710. The display device 21 is configured to indicate a peripheral map around the present position of the vehicle and various kinds of configuration screens such as a destination set screen. The whole surface of the display device 21 is equipped with a touch panel including a touch detector 12 and a front panel 14 shown in FIG. 3A. A user is enabled to implement a touch operation on the touch panel to operate a switch device indicated on the display device 21. The center console 720 is further equipped with a touchpad 81 as a remote control input device. A user is also enabled to implement a touch operation on the touchpad 81 to move a cursor indicated on the display device 21 and to operate a switch device indicated on the display device 21. The operation input device of the present embodiment is employed in the touch panel of the display device 21.

Figure 2:
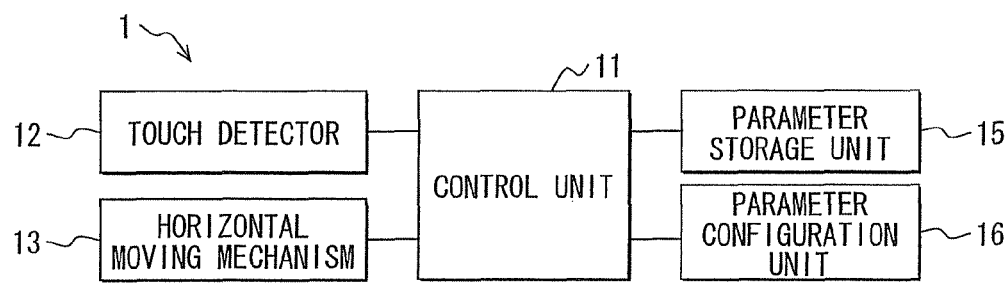
FIG. 2 is a block diagram showing an electronic configuration of an input operation device.
Figure 3A:
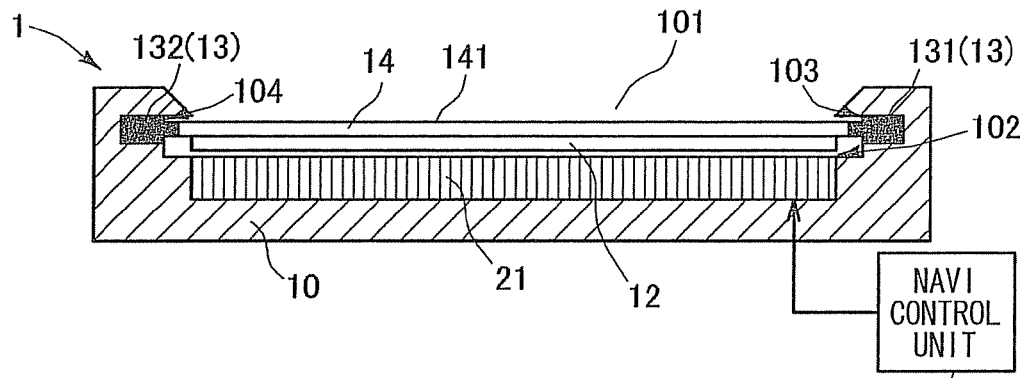
FIG. 3A and FIG. 3B are views showing the configuration of the input operation device.
Figure 3B:
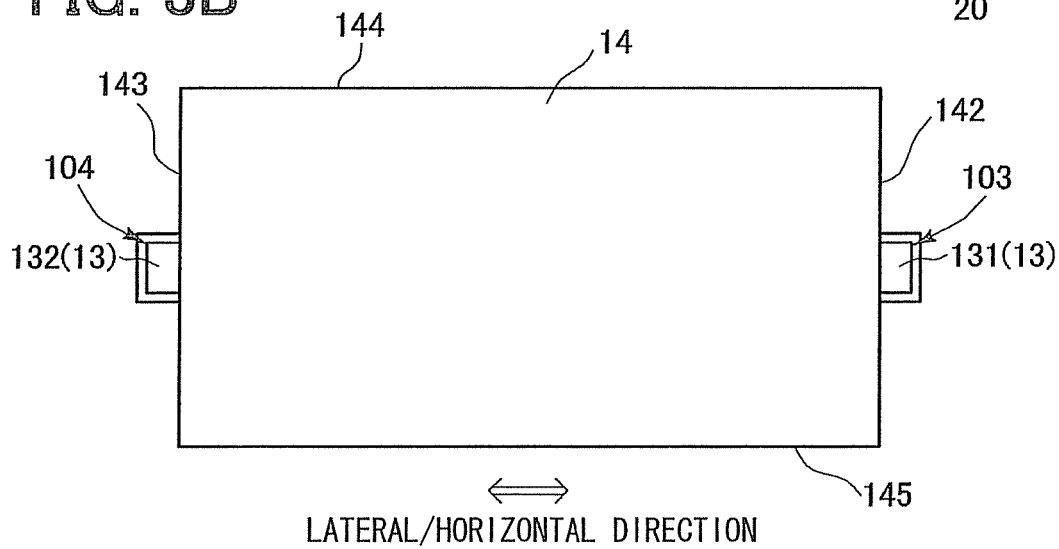

FIG. 2 is a block diagram showing the electrical configuration of the operation input device 1 according to the present embodiment. FIGS. 3A and 3B are explanatory views each showing the configuration of the operation input device 1. Specifically, FIG. 3A is a sectional view taken along the line A-A in FIG. 1 and showing the operation input device 1. FIG. 3B is an explanatory view showing a mount position of a horizontal moving mechanism part 13 (actuators 131 and 132) when being viewed from its front side with the front panel 14 of FIG. 3A. The line A-A in FIG. 1 extends in parallel with the horizontal direction of the display device 21. As shown in FIG. 2, FIGS. 3A and 3B, the operation input device 1 includes a housing 10, a control unit 11, the touch detector 12, the horizontal moving mechanism part 13, the front panel 14, a movement parameter storage unit 15, and a movement parameter configuration unit 16.

Referring to FIG. 3A, the front side of the housing 10 has an opening 101 correspondingly to the shape (rectangular shape) of the display device 21. An accommodating portion 102 is formed in the housing 10 and is communicated with the opening 101. The display device 21 is accommodated in the accommodating portion 102 and is located at the position opposed to the opening 101. Referring to FIG. 3A, a navigation control unit 20 controls indication of the display device 21. The navigation control unit 20 implements processing to function as a navigation device. Specifically, for example, the navigation control unit 20 reads peripheral map data related to the present position of the vehicle from a map data storage (not shown) and causes the display device 21 to indicate information on the read data. The navigation control unit 20 further causes the display device 21 to indicate various screens such as an operation screen including an image of a switch device and a destination configuration screen. When receiving a notification from the touch detector 12 that a touch operation is performed on an image of the switch device indicated on the display device 21, the navigation control unit 20 implements a processing, such as a reception processing to receive a character for determining a destination, according to the operated switch device. In the present embodiment, the navigation control unit 20, which is for controlling indication of the display device 21, is distinct from the control unit 11, which controls the movement of the front panel 14. It is notes that, these functions may be implemented by a single control unit.

The sheet-shaped (plate-like) touch detector 12 and the front panel 14 are provided on the display device 21 in the accommodating portion 102 and arranged in this order from the side of the display device 21. Similarly to the display device 21, the touch detector 12 and the front panel 14 are in rectangular shapes in those front views to surround the whole screen surface of the display device 21. The touch detector 12 and the front panel 14 are integrated to each other.

The front panel 14 is formed from a transparent material, such as glass or resin, and located directly under the opening 101. The front panel 14 has a flat surface 141 functioning as a manipulated surface on which the touch operation is implemented by a user. The touch detector 12 is located on the rear side of the front panel 14 for detecting the touch operation (touch position) on manipulated surface 141 of the front panel 14. Specifically, the touch detector 12 is a touch sensor having a generally-known detection configuration to detect a physical quantity such as a capacitance or a resistance. The touch detector 12 may has a resistive-film configuration. More specifically, it is conceivable to employ a projection-type capacitance sensor as the touch detector 12. In such a configuration, the touch detector 12 may include an electrode layer equipped with a number of transparent electrodes formed from a material such as indium tin oxide (ITO) and arranged in the shape of a matrix. In this case, when a finger touches on the manipulated surface 141 of the front panel 14, a capacitance change occurs in the electrode therearound. The touch detector 12 is configured to send a signal according to the position of the electrode in which the capacitance change occurs. That is, the touch detector 12 sends its detection signal according to the touch position. The control unit 11 and the navigation control unit 20 receive the detection signal sent from the touch detector 12. In the present embodiment, the front panel 14 is distinct from the touch detector 12. It is noted that, the front panel 14 and the touch detector 12 may be integrated into a front panel with a touch detection function.

The housing 10 has spaces 103 and 104 located around the right end and the left end of the front panel 14, respectively, and dented from the accommodating portion 102. The spaces 103 and 104 are equipped with actuators 131 and 132 respectively. The actuators 131 and 132 configure the horizontal moving mechanism part 13 shown in FIG. 2. More specifically, the actuator (right-side actuator) 131 is equipped in the space 103 on the right side, and the actuator (left-side actuator) 132 is equipped in the space 104 on the left side. Referring to FIG. 3B, the actuators 131 and 132 are opposed to each other through the front panel 14. More specifically, the right-side actuator 131 is connected around the center of a right end section 142 of the front panel 14 and configured to push (displace) the front panel 14 leftward to the left-side actuator 132. The left-side actuator 132 is connected around the center of a left end section 143 of the front panel 14 and configured to push (displace) the front panel 14 rightward to the right-side actuator 131. In the present configuration, the actuators 131 and 132 are driven alternately to move the front panel 14 and the touch detector 12, which is integrated with the front panel 14, in the lateral direction (horizontal direction) of the front panel 14 inversely to cause oscillation. The actuators 131 and 132 may employ, for example, a piezoelectric element or an electromagnetic solenoid.

Figure 4:
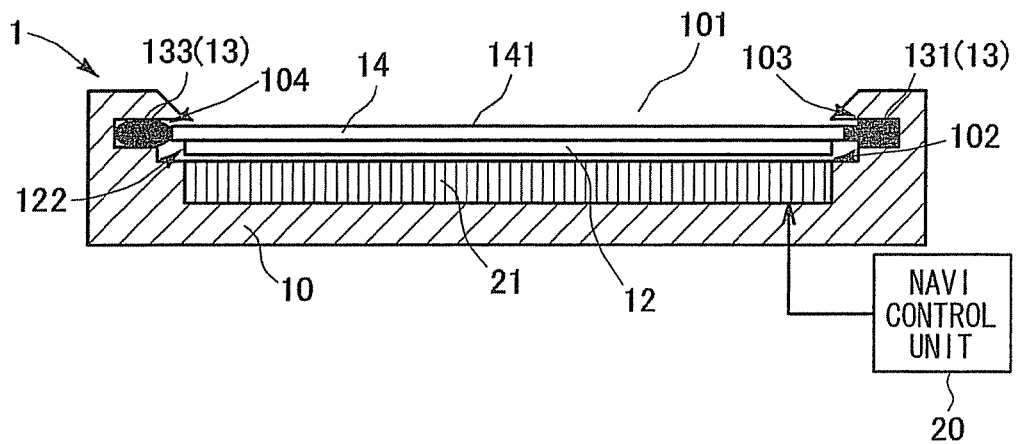
FIG. 4 is a view showing an example of the input operation device equipped with a spring instead of an actuator.

As shown in FIG. 4, one of the actuators 131 and 132 may be substituted with a biasing element such as a spring 133. In the example of FIG. 4, the left-side actuator 132 is substituted with the spring 133. In this case, when the right-side actuator 131 is actuated, the spring 133 is compressed to move the front panel 14 leftward. Thereafter, when the actuation of the right-side actuator 131 is terminated, resilience of the compressed spring 133 causes the front panel 14 to move rightward. In the present configuration with the spring 133, the front panel 14 can be oscillated in the horizontal direction. In this case, the right-side actuator 131 and the spring 133 configure the horizontal moving mechanism part 13 of FIG. 1. The configuration of FIG. 4 is equivalent to the configuration of FIG. 3A except for the spring 133.

In the example of FIG. 3A, the front panel 14 and the actuators 131 and 132 are arranged on the same straight line. It is noted that, the actuators 131 and 132 may be located at other positions. In this configuration, the actuators 131 and 132 may apply force to the front panel 14 via a link mechanism. In the present configuration, even in a case where a space for accommodating the actuators 131 and 132 cannot be secured around the front panel 14, the actuators 131 and 132 are enabled to move the front panel 14 in the horizontal direction. In the example of FIG. 3B, the actuators 131 and 132 are provided close to the center portions of the right end 142 and the left end 143 of the front panel 14, respectively. It is further noted that, the right end 142 and the left end 143 may be located at various positions, as long as the right end 142 and the left end 143 are enabled to move the front panel 14 in the horizontal direction. It is further noted that, actuators may be equipped to an upper end 144 and a lower end 145 of the front panel 14 (FIG. 3B), respectively, to enable movement of the front panel 14 in the vertical direction.

Referring to FIG. 2, the control unit 11 is configured with electronic devices such as a CPU, a ROM, and a RAM. The control unit 11 is configured to cause the CPU to implement various kinds of processings to execute programs stored in the ROM. The control unit 11 is electrically connected with the touch detector 12, the horizontal moving mechanism part 13, the movement parameter storage unit 15, and the movement parameter configuration unit 16. The control unit 11 implements a processing to drive the horizontal moving mechanism part 13 including the actuators 131 and 132 thereby to move the front panel 14, according to the detection signal sent from the touch detector 12. The processing will be described later in detail.

Figure 5:
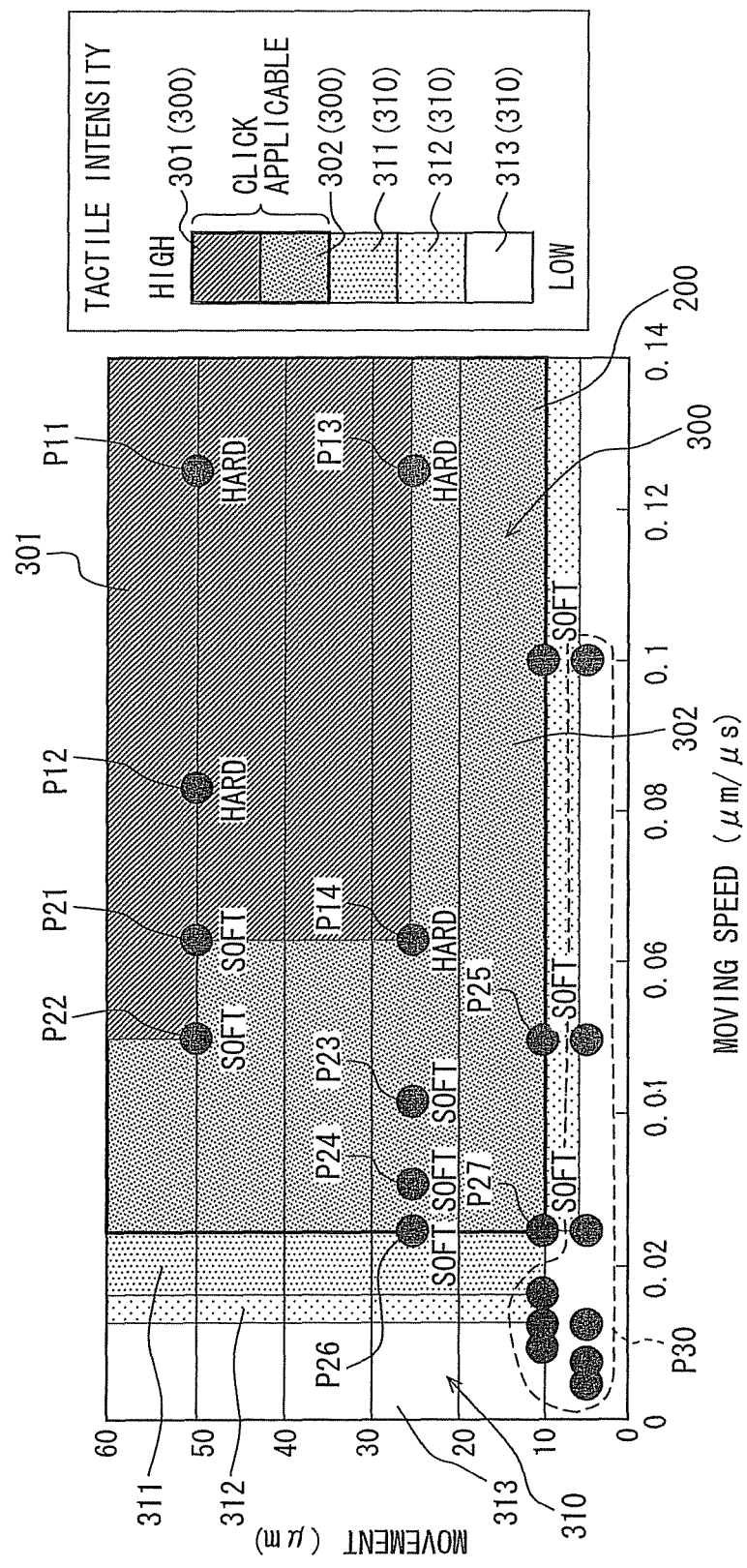
FIG. 5 is a view showing a change in a tactile intensity relative to a movement (movement quantity) and a moving speed of a front panel of the input operation device.

Herein, the operation of the control unit 11 to move the front panel 14 will be described. FIG. 5 is a view showing an experimental result (result of subjective evaluation) representing a change in a tactile intensity (hardness) relative to the movement (vertical axis) of the front panel 14 and relative to the moving speed (horizontal axis) of the front panel 14. In FIG. 5, each background color shows corresponding tactile intensity. Specifically, as the background color of the region becomes darker, the tactile intensity becomes stronger. More specifically, the region 301 specified with the darkest background color is the hardest tactile region representing the strongest tactile intensity, in other words, a hard tactile feeling. The hard tactile feeling is, for example, an operation feeling, caused when a keyboard of a personal computer is manipulated, such as a click sound.

The region 302 specified with the second-darkest background color is the second-hardest tactile region representing a soft tactile intensity, in other words, a soft tactile feeling. The soft tactile feeling is, for example, an operation feeling caused when a film-like switch device is operated. More specifically, the soft tactile feeling is a deeply slowly depressed feeling caused when, for example, a timer configuration switch of an appliance, such as a microwave oven or an electric rice cooker, is operated. A thick frame 200 defines a region 300 including the hard tactile region 301 and the soft tactile region 302 assigned with an operation feeling (click feeling) of a switch device caused when the touch operation is implemented on the manipulated surface 141 of the front panel 14. The region 300 represents a with-tactile feeling region. A region 311 with the third-darkest background color, a region 312 with the fourth-background color, and a region with non-background color (with the lightest background color) 313 are assigned with a slight tactile feeling or substantially non-tactile feeling. The regions 311 to 313 represent non-tactile feeling regions.

The multiple points P in FIG. 5 represent the actual evaluating points. The regions 301, 302, 310 are determined according to the actual evaluating points P. Specifically, the hard tactile region 301 is assigned according to the evaluating points P11 to P14 with evaluation results of hard tactile feelings. The soft tactile region 302 is assigned according to the evaluating points P21 to P27 with evaluation results of soft tactile feelings. The non-tactile region 310 is assigned according to the multiple evaluating points P30 with evaluation results of non-tactile feelings.

Referring to FIG. 5, in the with-tactile feeling region 300, the moving speed of the front panel 14 is greater than or equal to 10 μm, and the movement (movement quantity) of the front panel 14 is greater than or equal to 0.025 μm/μs. It is noted that, a region, not illustrated in FIG. 5, where the moving speed is greater than or equal to 0.14 μm/μs, and the movement is greater than or equal to 60 μm is also included in the with-tactile feeling region 300. When the movement of the front panel 14 is too large, the movement may be visible. In consideration of this, the movement of the front panel 14 may be determined within a range not to be visible when being actually moved. More specifically, the upper limit of the movement may be determined within, for example, 200 μm. Further specifically, the upper limit of the movement may be determined at 100 μm. In the hard tactile region 301 of the with-tactile feeling regions 300, the movement is greater than or equal to 25 μm, and the moving speed is greater than or equal to 0.06 μm/μs. In the non-tactile feeling region 310, the movement is less than or equal to 10 μm, and the moving speed is less than or equal to 0.025 μm/μs.

Strictly, it is conceivable to vary the assigned tactile feeling even in the same hard tactile region 301 when the movement and/or moving speed changes. Similarly, it is conceivable to vary the assigned tactile feeling even in the same hard tactile region 301 when the movement and/or moving speed changes. Specifically, the present inventors have a knowledge that a hard tactile feeling can be caused as the moving speed becomes large, under a constant movement.

Figures 6, 7:
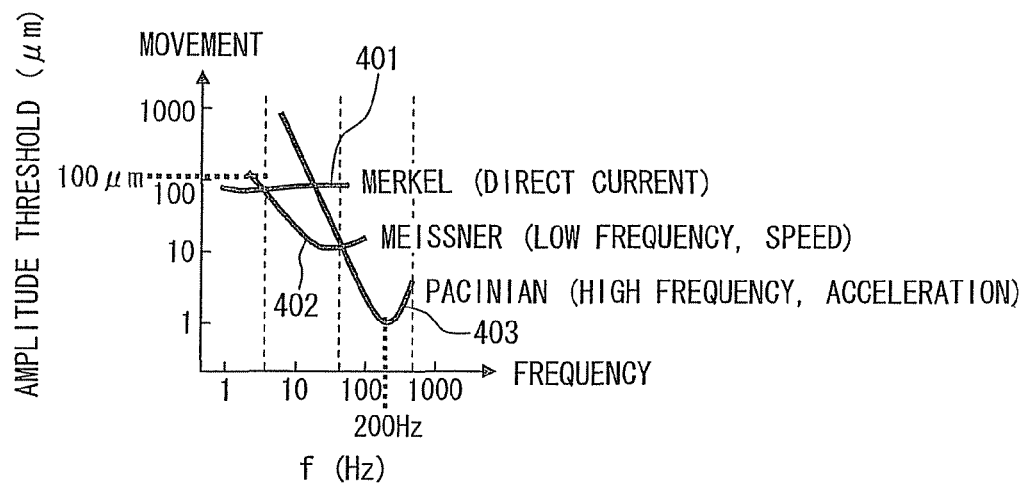
FIG. 6 is a view showing a characteristic of a skin sensory receptor.
FIG. 7 is a view showing a correspondence stored in a movement parameter storage unit of the input operation device.

Subsequently, the experimental result in FIG. 5 will be described with reference to a property of a sensory receptor of a skin. As shown in FIG. 6, the skin sensory receptor includes the Merkel cell, the Meissner's corpuscle, and the Pacinian corpuscle. Specifically, in FIG. 6, the lines 401 to 403 show the minimum oscillation characteristics (frequency f, amplitude A) of the Merkel cell, the Meissner's corpuscle, and the Pacinian corpuscle, respectively, needed to stimulate the corresponding sensory receptors. The line 401 shows the characteristic of the Merkel cell, the line 402 shows the characteristic of the Meissner's corpuscle, and the line 403 shows the characteristic of the Pacinian corpuscle. As shown by the line 401, in order to stimulate the Merkel cell, it is necessary to apply oscillation with the amplitude greater than or equal to about 100 μm. As shown by the line 402, in order to stimulate the Meissner's corpuscle, it is necessary to apply oscillation with the amplitude of about 10 μm at a relatively low frequency f in the range of 1 Hz to 100 Hz. As shown by the line 403, in order to stimulate the Pacinian corpuscle, it is necessary to apply oscillation with the amplitude larger than the amplitude when stimulating the Meissner's corpuscle in a low frequency range. To the contrary, it suffices to apply oscillation with the amplitude smaller than the amplitude when stimulating the Meissner's corpuscle in a high frequency range greater than or equal to 200 Hz. In the with-tactile feeling region 300 of FIG. 5, the movement is 60 μm or less. Therefore, in the with-tactile feeling region 300*m*, it is conceivable that the Meissner's corpuscle and the Pacinian corpuscle are mainly stimulated. In addition, in the non-tactile feeling region 310 in FIG. 5, it is conceivable that neither of the sensory receptors is stimulated.

Referring to FIG. 2, the control unit 11 moves the front panel 14 to satisfy the conditions (stimulable conditions) of the movement (movement quantity) and the moving speed belonging to the with-tactile feeling region 300 in FIG. 5. More specifically, the movement parameter storage unit 15 stores numerical values (movement parameters) of the movement and the moving speed, which satisfy the stimulable condition and belong to the with-tactile feeling region 300. The control unit 11 reads the movement parameter stored in the movement parameter storage unit 15 and moves the front panel 14 according to the read-out movement parameter.

The movement parameter storage unit 15 is a storage device, such as a hard disk drive unit, a flash memory, etc., storing the movement parameter beforehand, as described above. In the present embodiment, the movement parameter storage unit 15 stores multiple movement parameters being distinct from each other. FIG. 7 shows a correspondence 160 including the movement parameters stored in the movement parameter storage unit 15. The correspondence 160 in FIG. 7 includes a mode column 161 and a movement parameter column 162. The mode column 161 stores multiple modes corresponding to cases and users when the touch operation is implemented on the manipulated surface 141 of the front panel 14 in use of the vehicle. Specifically, the mode column 161 stores a normal mode supposing a normal traveling case, a sport mode supposing a sports-car-spec traveling case, a male mode supposing a male user, a female mode supposing a female user, etc.

The movement parameter column 162 stores movement parameters respectively corresponding to the modes stored in the mode column 161. Specifically, the movement parameter column 162 stores, for example, a movement parameter P23 corresponding to the normal mode and representing a soft tactile feeling related to the movement and the moving speed at the point P23 in FIG. 5. The movement parameter column 162 further stores, for example, a movement parameter P11 corresponding to the sport mode and representing a hard tactile feeling related to the movement and the moving speed at the point P11 in FIG. 5. Similarly, the movement parameter column 162 further stores, for example, a movement parameter P12 corresponding to the male mode and representing a hard tactile at the point P12 in FIG. 5. The movement parameter column 162 further stores, for example, a movement parameter P24 corresponding to the female mode and representing a soft tactile at the point P24 in FIG. 5.

The movement parameter configuration unit 16 in FIG. 2 is used to configure one of the modes stored in the mode column 161 of the correspondence 160 in FIG. 7. Specifically, the movement parameter configuration unit 16 is mechanical switch devices equipped to, for example, the center panel part 710 in the FIG. 1, correspondingly to the modes respectively. Alternatively, the movement parameter configuration unit 16 may be a configuration screen including images of the switch devices indicated on the display device 21 correspondingly to the modes respectively. In the configuration where the movement parameter configuration unit 16 is the configuration screen indicated on the display device 21, the control unit 11 figure outs beforehand the positions of the images of the switch devices on the display device 21. In addition, the control unit 11 determines which one of the images of the switch devices implemented with the touch operation, according to the detection signal sent from the touch detector 12. Thus, the control unit 11 configures the mode corresponding to the switch device being operated.

Figure 8:
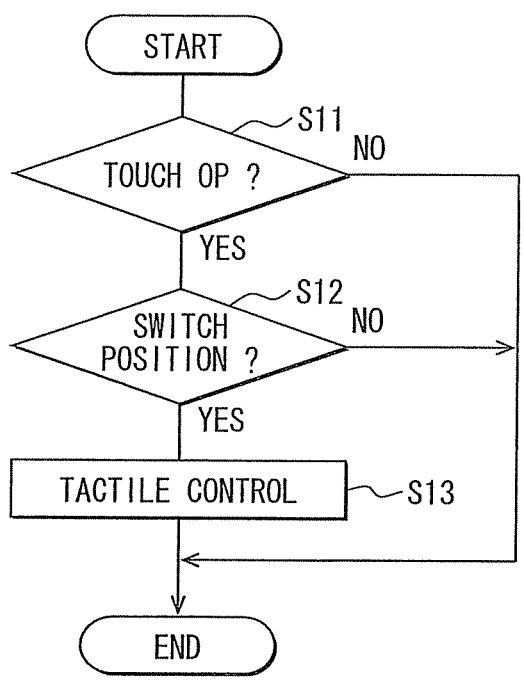
FIG. 8 is a flowchart showing a processing executed with a control unit according to the first embodiment.

Subsequently, the processing implemented by the control unit 11 when moving the front panel 14 at the time of the touch operation will be described. FIG. 8 is a flow chart showing the processing. The processing of the flowchart in FIG. 8 is activated when, for example, the engine of the vehicle is started to activate the control unit 11. Thereafter, the processing is implemented repeatedly at constant intervals. In the following description, it is supposed that one of the modes is set beforehand by the movement parameter configuration unit 16. In addition, it is further supposed that the display device 21 indicates a screen, such as a destination set screen, including an image of a switch device for instructing the operation of the navigation device.

First, the control unit 11 determines whether the touch operation is performed on the manipulated surface 141 of the front panel 14 (S11), according to the detection signal from the touch detector 12. When the touch operation is not performed (S11: No), the processing of the flowchart in FIG. 8 is terminated. Alternatively, when the touch operation is performed (S11: Yes), the control unit 11 determines whether the touch position is the position (switch device position) of the image of the switch device indicated on the display device 21, according to the detection signal from the touch detector 12 (S12). When the touch operation is performed on a position other than the switch device position (S12: No), the processing of the flowchart in FIG. 8 is terminated. Alternatively, when the touch operation is performed on the switch device position (S12: Yes), the processing proceeds to S13.

Figure 9:
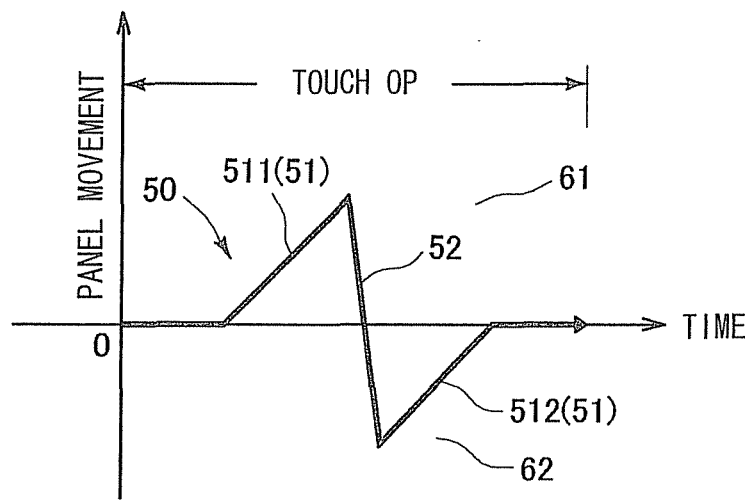
FIG. 9 is a view showing a change in movement of the front panel relative to a change in time in a tactile sense control.

At S13, the control unit 1 implements a tactile sense control (S13) to control driving operation of the actuators 131 and 132 of the horizontal moving mechanism part 13 thereby to move the front panel 14 in the horizontal direction. FIG. 9 shows a tactile-sense-control line (tactile sense control) 50 representing the change in the movement of the front panel 14 along the vertical axis relative to the time progress along the horizontal axis. In FIG. 9, the position (initial position) of the front panel 14 in the beginning of the tactile sense control is set at zero. The region 61 (first movement region) above the horizontal axis (time-axis) represents that the front panel 14 approaches one side (for example, right side) in the horizontal direction relative to the initial position. The region 62 (second movement region) below the horizontal axis represents that the front panel 14 approaches the other side (for example, left side) in the horizontal direction relative to the initial position. The inclination of the line 50 in FIG. 9 is equivalent to the moving speed (movement/movement time) of the front panel 14. The direction of the inclination of the line 50 represents the moving direction of the front panel 14. Specifically, the inclination upward in the right direction and the inclination downward in the right direction represent moving directions being opposite to each other. In the following description, it is supposed that when the line 50 (line 511 in FIG. 9) inclines upward in the right direction, the front panel 14 moves rightward toward the right-side actuator 131 (FIG. 3). Alternatively, it is supposed that when the line 50 (line 512 in FIG. 9) inclines downward in the right direction, the front panel 14 moves leftward toward the left-side actuator 132 (FIG. 3).

In FIG. 9, the line 50 of the tactile sense control is in a one-shot pulse shape. In detail, the line 50 includes the three lines 511, 52, 512. In the tactile sense control 50, as shown by the line 511, the left-side actuator 132 is first driven to move the front panel 14 rightward. In this case, the front panel 14 is moved from the initial position toward the first movement region 61. At this time, the front panel 14 is moved not to cause a tactile feeling with, specifically, the movement parameter, which belongs to the non-tactile feeling region 310 in FIG. 5. More specifically, in FIG. 5, the front panel 14 is moved with the movement parameter assigned with the movement less than 10 μm and the moving speed less than 0.025 μm/μs. Therefore, the inclination (moving speed) of the line 511 is gentle compared with the line 52 to be described later.

Subsequently, the tactile sense control 50 is implemented to drive the right-side actuator 131 thereby to move the front panel 14 leftward, as shown by the line 52. Thus, the front panel 14, which has been moved to the first movement region 61, is moved to the second movement region 62 beyond the original initial position (movement-zero position). At this time, the front panel 14 is moved with, specifically, the movement parameter (stimulable condition), which belongs to the with-tactile feeling region 300 in FIG. 5. Further, at this time, the front panel 14 is moved with a constant movement parameter to cause the line 52 at a constant inclination. More specifically, the control unit 11 reads the movement parameter, which corresponds to the mode set by the movement parameter configuration unit 16, from the movement parameter storage unit 15 (correspondence 160 in FIG. 7). Subsequently, the control unit 11 moves the front panel 14 with the read-out movement parameter. For example, when the movement parameter at the point P12 in FIG. 5 is used, the control unit 11 moves the front panel 14 by 50 μm at the moving speed of 0.08 μm/μs. In this case, in FIG. 9, the height of the line 52 is set to 50 μm, and the inclination of the line 52 is 0.08 μm/μs. With the present configuration, a constant tactile feeling according to the movement parameter can be applied once (one time) to the user. In the following description, the control represented by the line 52 may be referred to as the with-tactile feeling control, and the line 52 may be simply referred to as the with-tactile feeling control 52.

Subsequently, the tactile sense control 50 is further implemented to drive the left-side actuator 132 thereby to move the front panel 14 rightward, as shown by the line 512. Thus, the front panel 14, which has been moved to the second movement region 62, is moved to the original initial position (movement-zero position). At this time, the front panel 14 is moved with, specifically, the movement parameter, which belongs to the non-tactile feeling region 310 in FIG. 5. It is noted that, the movement parameter represented by the line 511 and the movement parameter represented by the line 512 may be the same as each other and may be different from each other. In the following description, the control represented by the lines 511, 512 may be referred to as the non-tactile feeling control, and the lines 511, 512 may be simply referred to as the non-tactile feeling control 51.

In the present configuration, the tactile sense control 50 is a combination of the one with-tactile feeling control 52, which stimulates the skin sensory receptor to apply the tactile feeling, and the two non-tactile feeling controls 51, which do not apply the tactile feeling. Therefore, the front panel 14 can be returned to the initial position subsequent to the tactile sense control 50 with application of the constant tactile feeling once. In addition, the tactile sense control 50 includes the non-tactile feeling controls 51 before and after the with-tactile feeling control 52. Therefore, it is possible to suppress the movement relative to the initial position where the movement is zero in FIG. 9. Thus, it is possible to let a user hardly notice the movement of the front panel 14. Subsequent to the tactile sense control at S13, the processing of the flowchart in FIG. 8 is terminated.

As described above, in the present embodiment, the tactile feeling is applied, at the time of the touch operation, with the hardness according to the mode being set beforehand. Therefore, the operation feeling (click feeling) when a mechanical switch device is depressed can be simulated precisely. In the present embodiment, configuration of the movement parameter is enabled on the movement parameter configuration unit 16. It is noted that, a predetermined constant movement parameter may be used.

Figure 10:
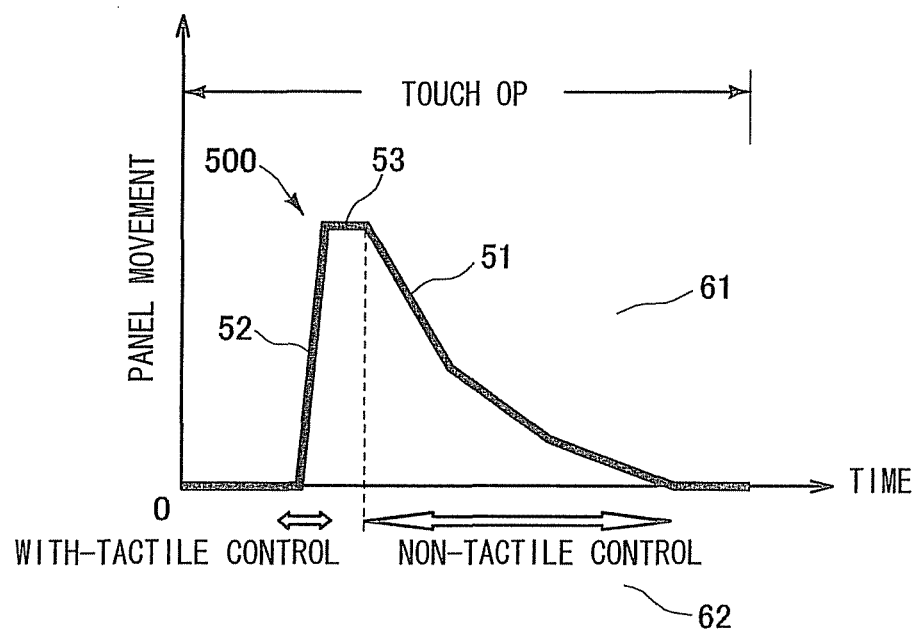
FIG. 10 is a view showing a tactile sense control according to a modification.

In the present embodiment, the tactile sense control 50 (FIG. 9) is implemented to perform the one with-tactile feeling control 52 and the two non-tactile feeling controls 51 in total before and after the one with-tactile feeling control 52. It is noted that, the present disclosure is not limited to the tactile sense control 50 of FIG. 9, as long as the constant tactile feeling can be applied once. FIG. 10 shows a tactile sense control 500 according to a modification. In FIG. 10, the same reference numerals are given to the elements with the same functions as those of the elements in FIG. 9. In the tactile sense control 500 of FIG. 10, the front panel 14 is moved only on the side of the first movement region 61. Specifically, in the tactile sense control 500, the with-tactile feeling control 52 is first implemented once on the side of the first movement region 61. Subsequently, as shown by the line 53, the non-control state is established, and the front panel 14 is not moved for a specific time period. Subsequently, the moving direction of the front panel 14 is inverted, and the non-tactile feeling control 51 is implemented once to return the front panel 14 to the initial position, without application of the tactile feeling. With the present configuration, the front panel 14 can be returned to the initial position, with application of the constant tactile feeling once. In addition, it suffices to implement the non-tactile feeling control 51 only once. Therefore, the control can be simplified. Further, by inserting the non-control state between the with-tactile feeling control 52 and the non-tactile feeling control 51, the sensitivity of the tactile feeling can be enhanced in the with-tactile feeling control 52. It is noted that, the inclination of the non-tactile feeling control 51 may not be constant as shown in FIG. 10, as long as the non-tactile feeling control 51 does not apply a tactile feeling. In addition, the front panel 14 may be moved only on the side of the second movement region 62. The non-tactile feeling control 51 may be implemented first, and subsequently, the with-tactile feeling control 52 may be implemented.

In the present embodiment, the tactile sense control including the non-tactile feeling control is implemented. It is noted that, the tactile sense control may be implemented to include only the with-tactile feeling control once. Also with the present configuration, the constant tactile feeling can be applied once without implementation of the non-tactile feeling control. Therefore, the control can be simplified. In this case, the front panel 14 may not return to the initial position at the end of the tactile sense control. Therefore, in each tactile sense control, the moving direction of the front panel 14 may be inverted from the moving direction at the last time. With the present configuration, it is possible to restrict the front panel 14 from moving largely away from the previous initial position.

In the present embodiment, the tactile sense control is implemented to include the with-tactile feeling control once. It is noted that, the tactile sense control may be implemented to include the with-tactile feeling controls twice or more. When the tactile sense control is implemented to include the with-tactile feeling controls twice or more, it is possible to apply repeated tactile feelings in a combined form to cause, for example, a vibration.

Second Embodiment

Figure 11:
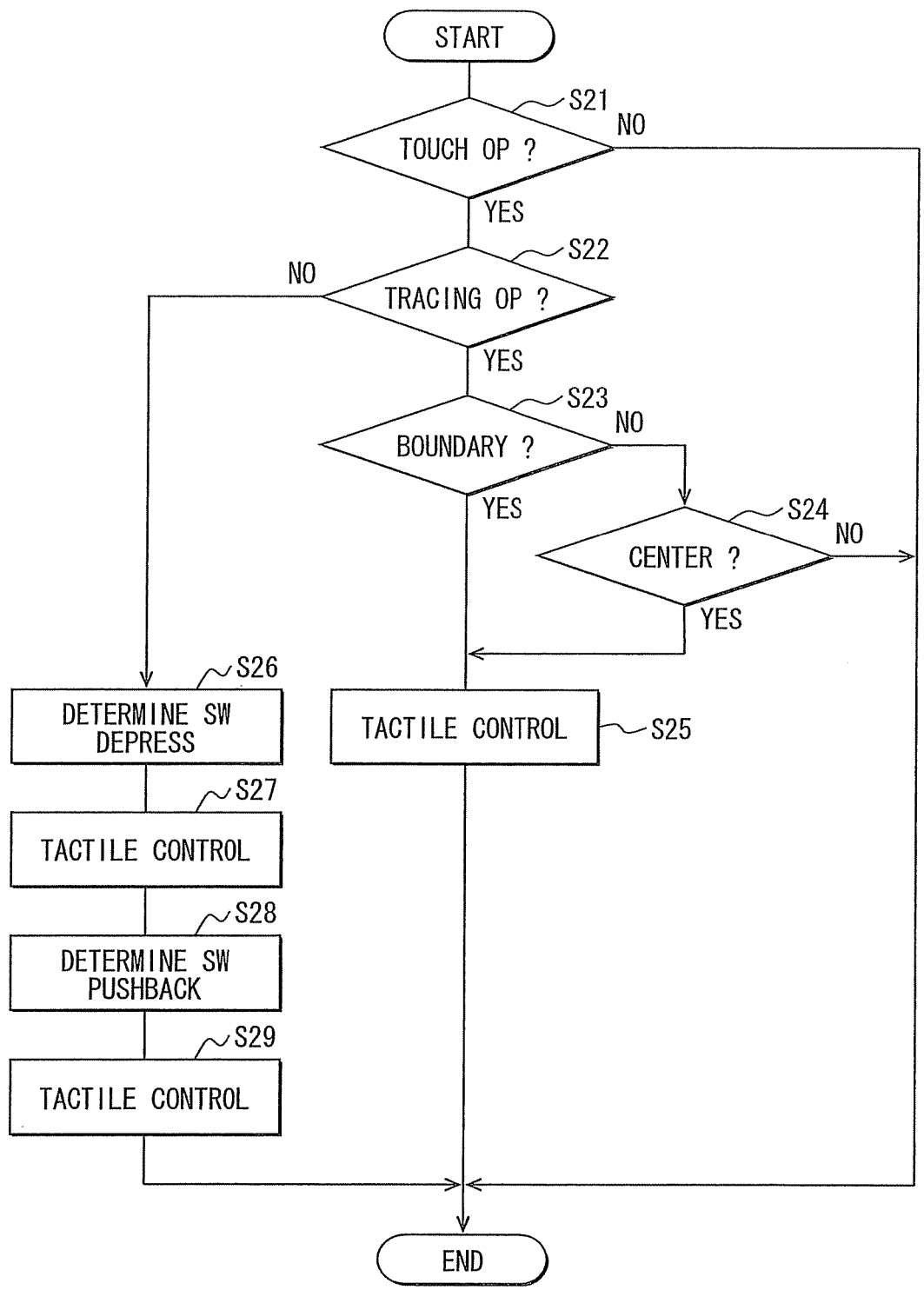
FIG. 11 is a flowchart showing a processing executed with a control unit according to the second embodiment.
Figure 12A:
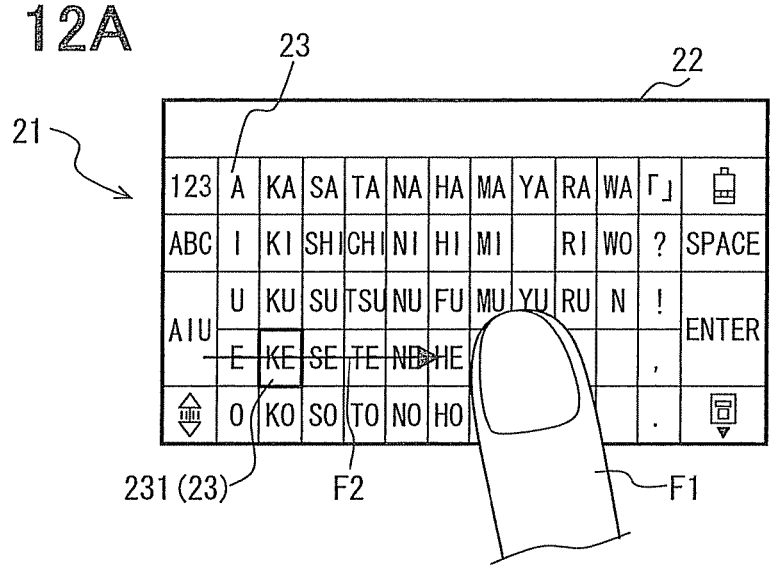
FIG. 12A, FIG. 12B, and FIG. 12C are explanatory views showing a character input screen of the operation input device and for explaining a tactile feeling applied in a tracing operation.

Subsequently, the operation input device according to the second embodiment of the present disclosure will be described. In the following description, difference from the first embodiment will be mainly described. The configuration of the operation input device according to the present embodiment is equivalent to that of the first embodiment shown in FIG. 2 and FIG. 3. In the present embodiment, the processing implemented with the control unit 11 differs from that in the first embodiment. FIG. 11 is a flowchart showing the processing implemented with the control unit 11 of the present embodiment. The processing of the flowchart in FIG. 11 is activated when, for example, the engine of the vehicle is started to activate the control unit 11. Thereafter, the processing is implemented repeatedly at constant intervals. In the following description, it is supposed that the display device 21 indicates a character input screen 22 shown in FIG. 12A. The character input screen 22 is configured with multiple character switch devices 23 being an array arranged in the vertical and horizontal direction with no gap therebetween. Each of the character switch devices 23 is denoted with corresponding one character, such as a kana letter, a numeral letter, an alphabetic letter, etc. to function as a switch device for accepting input of the denoted character. Each of the character switch devices 23 is in a rectangular shape defined with sides each having the length of several millimeters. FIG. 12A further shows a finger F1, which performs the touch operation on the character switch devices 23. A user is enabled to perform the touch operation on one character switch device 23 or multiple character switch devices 23 to input a character string, such as a destination, as desired.

In the flowchart shown in FIG. 11, the control unit 11 first determines whether the touch operation is performed on the manipulated surface 141 of the front panel 14 (S21), according to the detection signal from the touch detector 12. When the touch operation is not performed (S21: No), the processing of the flowchart in FIG. 11 is terminated. When the touch operation is performed (S21: Yes), it is determined whether the touch operation is an operation to depress the character switch device 23 or a tracing operation to trace the character switch device 23 (S22). The tracing operation may cause a state where the touch position changes continuously as the finger F1 is moved along with the arrow F2 shown in FIG. 12A. At S22, it is further specifically determined whether the operation is the tracing operation, according to the contact area of the finger F1 with the manipulated surface 141. When the tracing operation is performed on the character switch device 23, it is conceivable that a user does not intend to depress the character switch device 23. Therefore, in this case, it is conceivable that the contact area of the finger F1 becomes smaller compared with the case where the character switch device 23 is depressed. In consideration of this, at S22, it is determined whether the operation is the tracing operation, according to a determination result whether the contact area of the finger F1 is smaller than a predetermined threshold. It is noted that, the touch detector 12 sends the detection signal according to the touch position, which is equivalent to the contact area. Therefore, at S22, the contact area of finger F1 is determined according to the detection signal.

It is noted that, the determination whether the tracing operation is performed may be made in this way, according to the size of the contact area of the finger F1. Alternatively, the determination whether the tracing operation is performed may be made, according to a determination result whether the touch position changes continuously. It is conceivable that the force applied to the front panel 14 is smaller in the tracing operation, compared with the force in the depressing operation. Therefore, the determination whether the operation is the tracing operation may be made according to the force applied to the front panel 14. In this case, for example, a pressure sensor (denoted by the numeral 122 in FIG. 4) may be provided on the rear side of the front panel 14 to detect the force applied to the front panel 14, according to the detection signal of the pressure sensor.

When the touch operation is the tracing operation (S22: Yes), the processing proceeds to S23. At S23, it is determined whether the touch position is a boundary position corresponding to the boundary of the character switch device 23 (S23). Specifically, the control unit 11 retrieves beforehand display position information on each character switch device 23 from the navigation control unit 20 (FIG. 3A). The display position information enables identification of the display position of the boundary of each of the character switch device 23 and the display position of the center of each of the character switch device 23. It is determined whether the touch position is on the boundary position of the character switch device 23 (S23) with reference to the display position information. When the touch position is on the boundary position of the character switch device 23 (S23: Yes), the processing proceeds to S25.

Figure 12B:
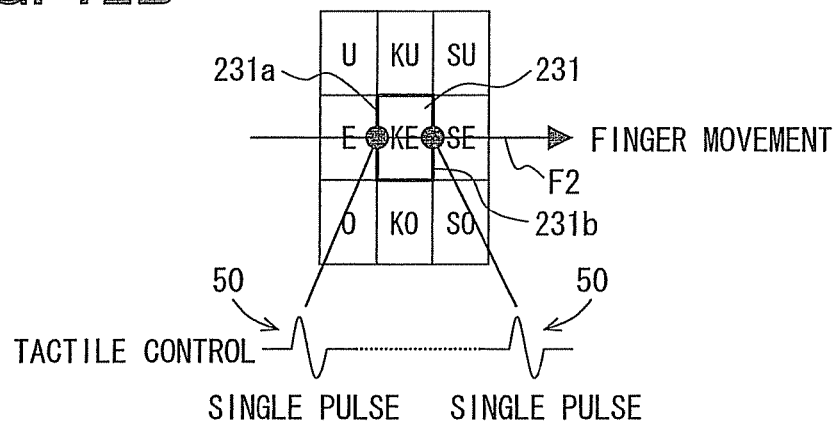

At S25, the tactile sense control is implemented to move the front panel 14 (S25). FIG. 12B is an enlarged view showing the character switch devices 231 around the character switch device 231 assigned with the character "ke" in FIG. 12A. For example, when the touch position is on the boundary positions 231a and 231b of the character switch device 231 assigned with "ke", the tactile sense control 50 described in FIG. 9 is implemented once at S25. Herein, the with-tactile feeling control 52 (FIG. 9) of the tactile sense control 50 is implemented to move the front panel 14 with the movement parameter, which applies the soft tactile feeling with a certain depth. Specifically, the movement parameter belonging to the soft tactile region 302 in FIG. 5 is used. More specifically, for example, the movement parameter at the point P22 in FIG. 5 is used to cause the movement by 50 µm in the movement time of 1 ms. Subsequent to S25, the processing of the flowchart in FIG. 11 is terminated.

Figure 12C:
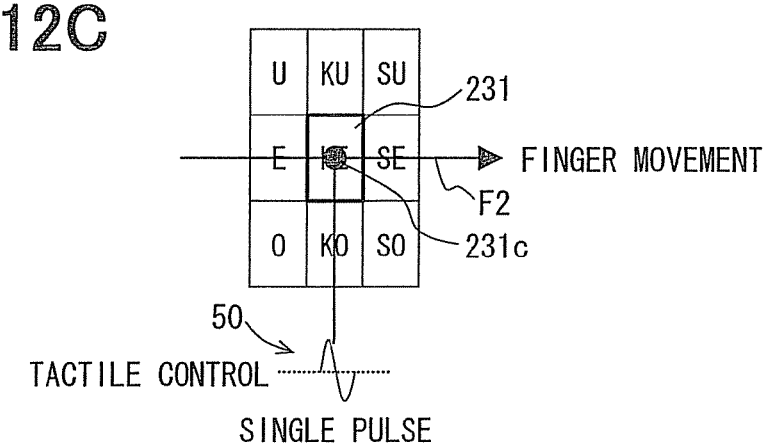

When the touch position is not on the boundary position of the character switch device 23 (S23: No), the processing proceeds to S24. At S24, it is determined whether the touch position is on the center position around the center of the character switch device 23 according to the display position information on the character switch device 23 retrieved from the navigation control unit 20 (S24). When the touch position is not on the center position (S24: No), the processing of the flowchart in FIG. 11 is terminated. In this case, the tracing operation is implemented at a position other than the boundary position and the center position of the character switch device 23. When the touch position is on the center position of the character switch device 23 (S24: Yes), the tactile sense control is implemented similarly to the case where the touch position is on the boundary position (S25). FIG. 12C is an enlarged view showing the character switch devices 231 around the character switch device 231 assigned with the character "ke" in FIG. 12A. As shown in FIG. 12C, for example, when the touch position is on the center position 231c of the character switch device 231, the tactile sense control 50 described in FIG. 9 is implemented once at S25. Herein, similarly to the case where the touch position is on the boundary position (S25), the movement parameter belonging to the soft tactile region 302 in FIG. 5 is employed, and the front panel 14 is moved with the movement parameter, which applies the soft tactile feeling with a certain depth. With the present configuration, the soft tactile feeling with the certain depth is applied on the boundary position and the center position of the character switch device 23 in the tracing operation. Therefore, a climbing-over feeling and/or a drawing feeling can be applied on each of the character switch devices 23. Thus, it is possible to find a desired one of the character switch devices 23. It is noted that, the tactile feeling may be applied to only one of the boundary position of the character switch device 23 and the center position of the character switch device 23.

Figure 13A:
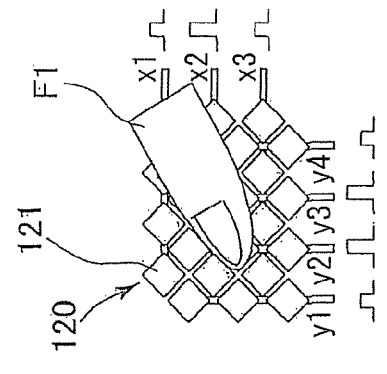
FIG. 13A, FIG. 13B, and FIG. 13C are views showing a change in a contact area of a finger in a depression process of a switch device.
Figure 13B:
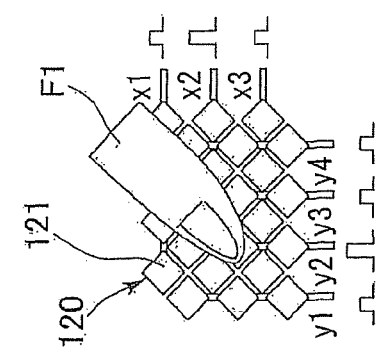
Figure 13C:
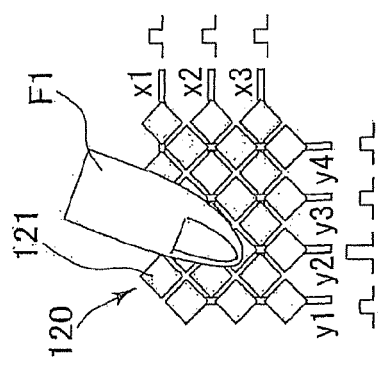

At S22, when the touch operation is not the tracing operation (S22: No), the processing proceeds to S26. In this case, it is conceivable that a user is depressing the character switch device 23. Therefore, the tactile sense control is implemented by executing the processing subsequent to S26, on assumption that the character switch device 23 is depressed. Specifically, at S26, it is determined whether the present operation is a depression process to depress the character switch device 23 (S26). FIGS. 13A to 13C are explanatory views showing the determination process whether the present operation is the depression process. Specifically, in the present example, the touch detector 12 has a configuration to detect its capacitance and includes an electrode layer 120 configured with a number of electrodes 121 arranged in the matrix state. More specifically, FIG. 13A shows the finger F1 in the beginning of the depression process, FIG. 13B shows the finger F1 in the middle of the depression process, and FIG. 13C shows the finger F1 in the end of the depression process.

The electrode layer 120 shown in FIG. 13 is configured with three rows x1 to x3 and four columns y1 to y4 each being coupled with multiple electrodes 121, respectively. In addition, the electrode 121 corresponding to the touch position specified by one of the rows x1 to x3 and one of the columns y1 to y4 sends a detection signal.

In the beginning of the present depression process, the contact area of the finger F1 with the manipulated surface 141 is not so large. Therefore, in the example of FIG. 13A, the electrode 121 belonging to the column y2 is reacting to the finger F1. Hereinafter, the contact state of the finger F1 in FIG. 13A is referred to as a state T1. Thereafter, in the middle of the depression process shown in FIG. 13B, the contact area of the finger F1 becomes larger. In the example of FIG. 13B, the electrode 121 belonging to the column y2 and the electrode 121 belonging to the row x2 react to the finger F1. Hereinafter, the contact state of the finger F1 in FIG. 13B is referred to as a state T2. Further, in the end of the depression process shown in FIG. 13C, the contact area of the finger F1 becomes further larger. In the example of FIG. 13C, the electrode 121 belonging to the column y2, the electrode 121 belonging to the column y3, and the electrode 121 belonging to the row x2 react to the finger F1. Hereinafter, the contact state of the finger F1 in FIG. 13C is referred to as a state T3. In this way, when the present operation process is the depression process, the contact area of the finger F1 becomes larger gradually. In consideration of this, at S26, it is determined that the present operation process is the depression process on determination that the contact area of the finger F1 becomes larger gradually. More specifically, for example, the determination of the depression process may be made on determination that that the change in the contact area becomes greater than a predetermined threshold.

Figure 14:
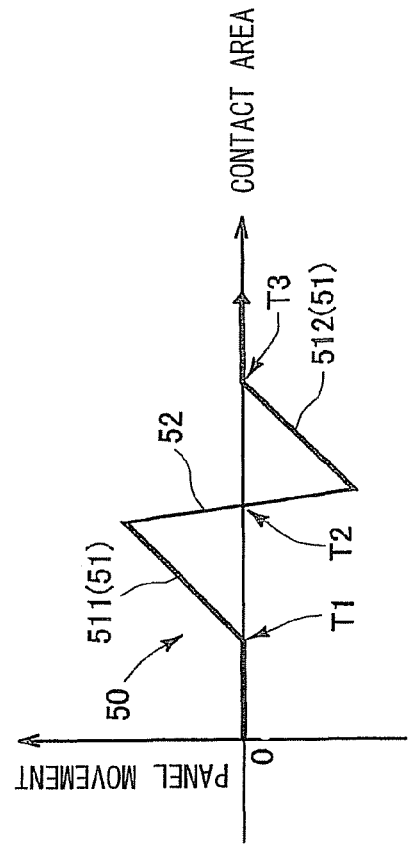
FIG. 14 is a view showing the tactile control implemented in the depression process of the switch device.

Subsequently, the front panel 14 is moved, and the tactile sense control is implemented once (S27). Strictly, the tactile sense control at S27 is implemented in parallel to the determination at S26. FIG. 14 shows the tactile sense control 50 implemented at 827. Specifically, FIG. 14 shows the change in the movement of the front panel 14 along the vertical axis relative to the change in the contact area of the finger F1 along the horizontal axis. The tactile sense control 50 in FIG. 14 is equivalent to the tactile sense control 50 in FIG. 9. The tactile sense control 50 in FIG. 14 includes the first non-tactile feeling control 511, the with-tactile feeling control 52, and the second non-tactile feeling control 512. The horizontal axis in FIG. 14 is further denoted with the contact states T1 to 13 of the finger F1 corresponding to the stages in FIG. 13A to FIG. 13C, respectively. As shown in FIG. 14, when the contact state is in the state T1, the tactile sense control 50 is started at 827. First, the first non-tactile feeling control 511 is implemented until the state transits to the state T2. Thereafter, the with-tactile feeling control 52 is implemented around the state T2. In FIG. 14, the with-tactile feeling control 52 is started immediately before the state T2, and the with-tactile feeling control 52 is terminated immediately after the state 12. Thereafter, the second non-tactile feeling control 512 is implemented until the state transits to the state T3. With the present configuration, the tactile feeling can be applied once in the depression process.

Figure 15A:
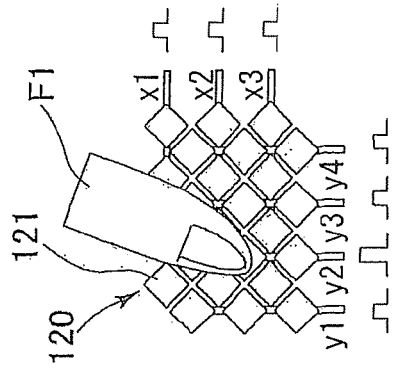
FIG. 15A, FIG. 15B, and FIG. 15C are views showing a change in the contact area of the finger in a pushback process of the switch device.
Figure 15B:
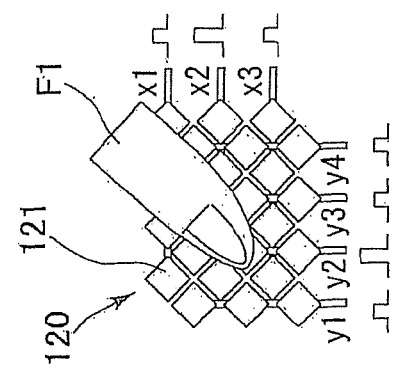
Figure 15C:
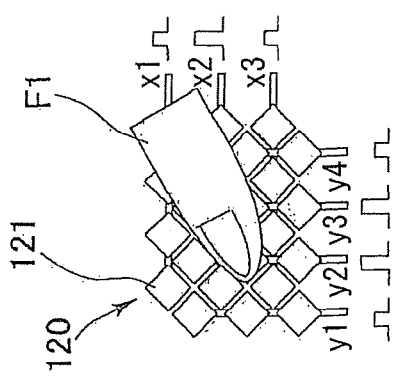

Referring to FIG. 11, subsequently, it is determined whether the present operation is a pushback process to pushback the character switch device 23 (S28). In this case, the determination is made by employing the opposite procedure to that of the above-described depression process. FIGS. 15A to 15C are explanatory views showing the contact states of the finger F1 with each electrode 121 of the touch detector 12 in the pushback process. More specifically, FIG. 15A shows the finger F1 in the beginning of the pushback process, FIG. 15B shows the finger F1 in the middle of the pushback process, and FIG. 15C shows the finger F1 in the end of the pushback process. FIGS. 15A to 15C further show the contact areas in respective stages and the row and the column to which the electrode 121 reacting to the finger F1 belongs. As shown in FIG. 15, in the pushback process, the contact area becomes smaller gradually, as the state transients from the beginning of the pushback process to the end of the pushback process. In consideration of this, at S28, on determination that the contact area of the finger F1 becomes smaller gradually, it is determined that the present operation process is the pushback process. Hereinafter, the contact state of the finger F1 in FIG. 15A is referred to as the state T3 being the same as the state T3 in FIG. 13C. Similarly, the contact state of the finger F1 in FIG. 15B is referred to as the state T2, and the contact state of the finger F1 in FIG. 15C is referred to as the state 11.

In this way, it may be determined whether the present state is the depression process or the pushback process according to the change in the contact area of the finger F1. Alternatively, the depression force applied to the front panel 14 may be detected with a pressure sensor or the like, it may be determined whether the present state is the depression process or the pushback process according to change in the depression force. In this case, the pressure sensor or the like, which detects the depression force, may be equivalent to a depression force detection unit of the present disclosure. Further, in a configuration where the touch detector 12 is a touch sensor configured to detect its capacitance, it may be determined whether the present state is the depression process or the pushback process according to change in a contact capacitance between the finger F1 and the electrode. In the present configuration, detection of the contact area of the finger F1 enables indirect detection of the contact capacitance, in consideration of that the contact area of the finger F1 correlates with the contact capacitance.

Figure 16:
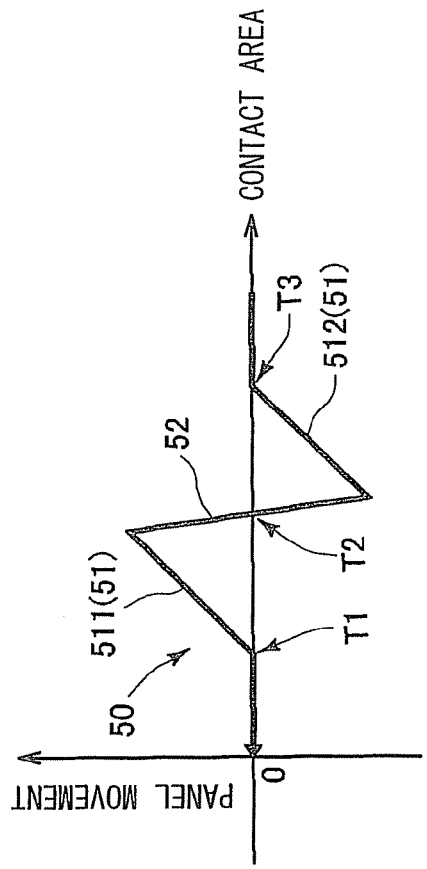
FIG. 16 is a view showing the tactile control implemented in the pushback process of the switch device.

Subsequently, the front panel 14 is moved, and the tactile sense control is implemented once (S29). Strictly, the tactile sense control at S29 is implemented in parallel to the determination at S28. FIG. 16 shows the tactile sense control 50 implemented at S29. Specifically, FIG. 16 shows the change in the movement of the front panel 14 along the vertical axis relative to the change in the contact area of the finger F1 along the horizontal axis. In the pushback process, the contact area becomes smaller gradually. In consideration of this, in FIG. 16, the tactile sense control 50 is implemented along the horizontal-axis from the side where the contact area is large to the side where the contact area is small. The tactile sense control 50 in FIG. 16 is equivalent to the tactile sense control 50 in FIG. 9. The tactile sense control 50 in FIG. 16 includes the first non-tactile feeling control 511, the with-tactile feeling control 52, and the second non-tactile feeling control 512. The tactile sense control 50 of FIG. 16 is implemented from the non-tactile feeling control 512 on the right side in the drawing. Therefore, in this case, this non-tactile feeling control 512 on the right side is referred to as the first non-tactile feeling control, and the non-tactile feeling control 511 on the left side is referred to as the second non-tactile feeling control. The horizontal axis in FIG. 16 is further denoted with the states T1 to T3 in the stages in FIG. 15A to FIG. 15C, respectively.

As shown in FIG. 16, at S29, the tactile sense control 50 is implemented in the opposite procedure to that of the tactile sense control (S27) in the depression process. Specifically, the tactile sense control 50 is started when the state transits into the beginning of the pushback process (state T3). The first non-tactile feeling control 512 is implemented until the state transits to the middle of the pushback process (state T2). Thereafter, the with-tactile feeling control 52 is implemented around the state T2. Thereafter, the second non-tactile feeling control 511 is implemented until the state transits to the end of the pushback process (state T1). With the present configuration, the tactile feeling can be applied once in the pushback process. Subsequent to S29, the processing of the flowchart in FIG. 11 is terminated.

As described above, in the present embodiment, in addition to the tactile feeling grant in the tracing operation, the tactile feeling is applied once in each of the depression process and the pushback process through the depressing operation. That is, the tactile feeling is applied twice in total through the depressing operation including the depression process and the pushback process. Therefore, the operation feeling (click feeling) of a mechanical switch device can be simulated more precisely.

The operation input device related to the present disclosure is not limited to those in the above-described embodiments and may be variously modified. For example, in the above embodiments, the present disclosure is applied to the touch panel of the display device. It is noted that, the present disclosure may be applied to another touch sensor configured to accept a touch operation. Specifically, for example, the present disclosure may be applied to the touchpad 81 shown in FIG. 1. In this case, the touchpad 81 is moved in response to a touch operation implemented on the touchpad 81. It is hard to perform a touch operation at a desired position on a remote control input device, such as a touchpad, compared with the touch operation implemented directly on the display device. Therefore, it is further effective to apply the present disclosure to a remote control input device. In addition, for example, a touch sensor may be equipped to the center panel part 710 in FIG. 1. In this case, the present disclosure may be applied to the touch sensor of the center panel part 710.

In the above embodiments, the tactile sense control is implemented with the movement of the front panel 14 and the moving speed of the front panel 14 as the parameters. It is noted that, the tactile sense control may be implemented with the movement of the front panel 14 and the acceleration of the front panel 14 as parameters. In consideration that the acceleration is equivalent to the momentary change of the moving speed, it is conceivable that the tactile feeling can be applied according to the acceleration in the configuration where the acceleration is employed as the parameter, instead of the moving speed.

In the above embodiments, the front panel 14 is moved in the horizontal direction of the manipulated surface 141. It is noted that, the front panel 14 may be moved in a direction, such as the vertical direction of the manipulated surface 141, other than the horizontal direction. Even in the configuration where the front panel 14 is moved in a direction other than the horizontal direction of the manipulated surface 141, the skin sensory receptor can be stimulated. In this case, a sensory receptor, such as the Merkel cell, other than the Meissner's corpuscle and the Pacinian corpuscle may also be stimulated when the front panel 14 is moved in a specific direction. Therefore, the movement parameter may be configured in consideration of the characteristic of the sensory receptor.

In the above-described embodiments, the front panel 14 may be equivalent to a touch operation unit of the present disclosure. The touch detector 12 may be equivalent to an operation detection unit of the present disclosure. The horizontal moving mechanism part 13, which includes the actuators 131 and 132 and the spring 133, may be equivalent to an operation unit moving unit (moving unit) of the present disclosure. The control unit 11 may be equivalent to a movement control unit of the present disclosure. The movement parameter configuration unit 16 may be equivalent to a condition configuration unit of the present disclosure. The display device 21 may be equivalent to a display unit of the present disclosure. The section of the control unit 11 implementing the processing at S23 in FIG. 11 is equivalent to a boundary position determination unit of the present disclosure. The section of the control unit 11 implementing the processing at S24 in FIG. 11 is equivalent to a center position determination unit of the present disclosure. The section of the control unit 11 implementing the processing at S25 in FIG. 11 is equivalent to a boundary movement control unit and a center movement control unit. The section of the control unit 11 implementing the processing at S26 in FIG. 11 is equivalent to the first operation process determination unit of the present disclosure. The section of the control unit 11 implementing the processing at S28 in FIG. 11 is equivalent to the second operation process determination unit of the present disclosure.

As described above, the operation input device may include: the touch operation unit having the manipulated surface to which the input is implemented by the touch operation; the operation detection unit configured to detect the touch operation on the manipulated surface; the operation unit moving unit (moving unit) configured to move the touch operation unit; and the movement control unit configured to control the movement of the touch operation unit by driving and controlling the operation unit moving unit when the operation detection unit detects the touch operation. In this case, the movement control unit may be further configured to control the movement of the touch operation unit to satisfy: the condition of the movement (movement quantity) and the moving speed of the touch operation unit enabling stimulation of the skin sensory receptor; or the stimulable condition predetermined as the condition of the movement (movement quantity) and the acceleration of the touch operation unit.

The present inventors found out that the skin sensory receptor, such as the Meissner's corpuscle and the Pacinian corpuscle, can be stimulated in a condition where a skin, such as a user's finger, is in contact with an object and when the amount of slide of the skin (movement of the skin in the horizontal direction of the object) and the moving speed or the acceleration, which is the momentary change of the moving speed, satisfy a predetermined condition. Furthermore, the present inventors found out change in the value of the movement (movement quantity) of the skin and change in the value of the moving speed or the acceleration enables application of the tactile feeling being distinct in hardness.

According to the present disclosure, at the time of the touch operation, the touch operation unit is moved with the predetermined stimulable condition, which can stimulate the skin sensory receptor, namely, the condition of the movement (movement quantity) and the moving speed or the acceleration of the touch operation unit, which can stimulate the skin sensory receptor. Therefore, an operation feeling can be applied to a user. In addition, the tactile feeling of the hardness can be applied to a user according to the movement (movement quantity) and the moving speed or the acceleration of the touch operation unit. Therefore, the tactile feeling with a desired hardness can be applied by controlling the movement (movement quantity) and the moving speed or the acceleration of the touch operation unit.

The operation unit moving unit may be further configured to move the touch operation unit in the horizontal direction of the manipulated surface.

With the present configuration, the touch operation unit moves the manipulated surface in the horizontal direction at the time of the touch operation. Therefore, the skin of the user being in contact with the manipulated surface can be moved in the sharing direction (horizontal direction) relative to the manipulated surface. Therefore, the sensory receptor of the user's skin can be stimulated effectively.

The stimulable condition may be: the movement (movement quantity) of the touch operation unit greater than or equal to 10 μm; and the moving speed of the touch operation unit greater than or equal to 0.025 μm/μs. The present inventors have obtained the knowledge according to a subjective evaluation result that the movement of the touch operation unit in the numerical value range of the stimulable condition enables stimulation of the sensory receptor. In consideration of the obtained knowledge, the touch operation unit is moved by the movement quantity and the moving speed within in the numerical value range, thereby to apply the operation feeling in the touch operation.

The operation input device may further include the condition configuration unit configured to set one of multiple distinct stimulable conditions. In this case, the movement control unit may be further configured to implement the movement control of the touch operation unit with the stimulable condition being set by the condition configuration unit. The present configuration enables setting of the distinct (different) stimulable condition. Therefore, the tactile feeling with the distinct hardness can be applied.

The movement control unit may be further configured to implement the tactile sense control, which is to move the touch operation unit with the stimulable condition being constant, once or multiple times. With the present configuration, the constant stimulable condition is employed in the tactile sense control in one time. Therefore, the constant tactile feeling can be applied in one time (one implementation) of the tactile sense control. The movement control unit may implement the tactile sense control once or for multiple times. When the tactile sense control is implemented once, the tactile feeling being constant can be applied once. Therefore, the tactile feeling close to the operation feeling (click feeling) of a switch device can be applied. Alternatively, when the tactile sense control is implemented for multiple times, it is possible to apply repeated tactile feelings in the combined form to cause, for example, a vibration.

The operation unit moving unit may be further configured to invert the moving direction of the touch operation unit. In this case, it may be defined that, the with-tactile feeling control is the movement control of the touch operation unit, which satisfies the stimulable condition, the non-tactile feeling control is the movement control of the touch operation unit, which does not satisfy the stimulable condition. In this case, the tactile sense control may be the combination, in one time, including: the with-tactile feeling control, one time, with the stimulable condition being constant; and the non-tactile feeling control, once or multiple times, the non-tactile feeling control being inverted relative to the moving direction of the touch operation unit when implementing the with-tactile feeling control.

With the present configuration, when the tactile sense control is implemented one time, the with-tactile feeling control with the constant stimulable condition is implemented one time. Therefore, the constant tactile feeling can be applied once. In addition, the tactile sense control once (in one time) includes one or multiple non-tactile feeling control inverted relative to the moving direction of the touch operation unit at the time of the operation of the with-tactile feeling control. Therefore, the movement of the touch operation unit can be restrained in the entire tactile sense control. Therefore, the movement in the with-tactile feeling control with the stimulable condition can be taken in a broad range. Consequently, more tactile feeling can be applied. Furthermore, the non-tactile feeling control is to move the touch operation unit with the condition, which does not satisfy the stimulable condition. Therefore, it is possible not to cause the user to feel the tactile feeling in the operation of non-tactile feeling control. Therefore, it is avoidable to cause discomfort due to unnecessary application of the tactile feeling.

The tactile sense control may be the control in which the movement of the touch operation unit at the time of the with-tactile feeling control is the same as the movement of the touch operation unit at the time of the non-tactile feeling control. With the present configuration, it is possible to reduce change in the position of the touch operation unit before and after implementation of tactile sense control.

The operation unit moving unit may be further configured to move the touch operation unit in the first direction and the second direction, which are opposite to each other. In this case, It may be defined that the initial position is the position at which the touch operation unit is located when the tactile sense control is started, the first movement region is the movement region of the touch operation unit where the touch operation unit approaches in the first direction relative to the initial position as reference, the second movement region is the movement region of the touch operation unit where the touch operation unit approaches in the second direction relative to the initial position as reference. In this case, the tactile sense control may be the control: first to implement the non-tactile feeling control once toward the first movement region; subsequently to invert the moving direction of the touch operation unit and to implement the with-tactile feeling control once from the side of the first movement region toward the second movement region; and subsequently to invert the moving direction of the touch operation unit and to implement the non-tactile feeling control once from the side of the second movement region toward the initial position.

With the present configuration, the with-tactile feeling control is implemented once from the side of the first movement region toward the side of the second movement region by passing over the initial position. Therefore, displacement of the touch operation unit relative to the initial position can be reduced, compared with the configuration where the with-tactile feeling control is implemented only to one side. In addition, the non-tactile feeling control is implemented in the beginning of the tactile control and in the end of the tactile control. Therefore, the above-described with-tactile feeling control can be implemented to pass through the initial position. In addition, the position of the touch operation unit can be returned to the initial position in the end of the tactile sense control.

The operation unit moving unit may be further configured to move the touch operation unit in the first direction and the second direction, which are opposite to each other. In this case, it may be defined that the initial position is the position at which the touch operation unit is located when the tactile sense control is started, the first movement region is the movement region of the touch operation unit where the touch operation unit approaches in the first direction relative to the initial position as reference, the second movement region is the movement region of the touch operation unit where the touch operation unit approaches in the second direction relative to the initial position as reference. In this case, the tactile sense control may be the control: first to implement the with-tactile feeling control once toward one of the first movement region and the second movement region; and subsequently to invert the moving direction of the touch operation unit and to implement the non-tactile feeling control once toward the initial position. Alternatively, the tactile sense control may be the control: first to implement the non-tactile feeling control once toward one of the first movement region and the second movement region; and subsequently to invert the moving direction of the touch operation unit and to implement the with-tactile feeling control once toward the initial position.

With the present configuration, the tactile sense control is implemented only on the side of one of the first movement region and the second movement region. Specifically, the with-tactile feeling control is implemented one time on the side of the one region, and the non-tactile feeling control is implemented one time on the side of the one region. Therefore, it suffices to implement the non-tactile feeling control only once. Thus, the configuration of the control can be simplified, compared with the case where the tactile sense control is implemented in each of the first movement region and the second movement region. It is noted that, the order of implementation of the with-tactile feeling control and the non-tactile feeling control may be arbitrary determined. Specifically, the non-tactile feeling control may be implemented before the with-tactile feeling control, and alternatively, the with-tactile feeling control may be implemented before the non-tactile feeling control.

The movement control of the touch operation unit, which satisfies the stimulable condition, may be the with-tactile feeling control. In this case, the tactile sense control may be the control to implement, in one time, only the with-tactile feeling control once with the stimulable condition being constant.

Even in the present case where only the with-tactile feeling control with the constant stimulable condition is implemented once in this way, the constant tactile feeling can be applied once in the tactile sense control in one time. In this case, it is not necessary to implement the non-tactile feeling control. Therefore, the control can be simplified. In this case, the touch operation unit may not return to the initial position in the end of the tactile sense control. In consideration of this, the moving direction of the touch operation unit in the present tactile sense control may be inverted relative to the previous tactile sense control.

That is, the operation unit moving unit may be further configured to invert the moving direction of the touch operation unit. In this case, the movement control unit may be further configured to: invert the moving direction of the touch operation unit in the previous tactile sense control operation; and implement the present tactile sense control. With the present configuration, it is possible to restrict the touch operation unit from moving largely away from the previous initial position.

The manipulated surface may be associated with the screen of the display unit configured to indicate the image of the switch device for implementing input by the depression operation. In this case, The operation detection unit may be further configured to detect the touch position on the manipulated surface. The operation input device my further include: the boundary position determination unit configured to determine whether the touch position detected with the operation detection unit is the boundary position corresponding to the boundary of the image of the switch device. The movement control unit may include the boundary movement control unit configured to implement the tactile sense control when the boundary position determination unit determines that the touch position is on the boundary position, at the time of the tracing operation, which is the operation in which the touch position detected with the operation detection unit changes continuously.

With the present configuration, the tactile feeling can be applied at the boundary position of the switch device at the time of the tracing operation. Therefore, the climbing-over feeling of the switch device, i.e., the drawing feeling into the switch device can be applied. Therefore, the position of a desired switch device can be easily found out at the time of the tracing operation.

The operation input device may further include the center position determination unit configured to determine whether the touch position detected with the operation detection unit is the center position corresponding to the center of the image of the switch device. In this case, the movement control unit includes, instead of the boundary movement control unit or in addition to the boundary movement control unit, the center movement control unit configured to implement the tactile sense control when the center position determination unit determines that the touch position is the center position at the time of the tracing operation. As exemplified in the present configuration, the tactile feeling may be applied at the center position of the switch device at the time of the tracing operation. In this way, the climbing-over feeling of the switch device, i.e., the drawing feeling into the switch device can be also applied.

The manipulated surface may be associated with the screen of the display unit configured to indicate the image of the switch device for implementing input by the depression operation. In this case, the operation input device may further include: the first operation process determination unit configured to determine whether the touch operation on the manipulated surface is the operation in the depression process relative to the switch device; and the second operation process determination unit configured to determine whether the touch operation on the manipulated surface is the operation in the pushback process relative to the switch device, subsequent to the operation in the depression process. In this case, the movement control unit may be further configured: to implement the tactile sense control once, when the first operation process determination unit determines that the touch operation is the operation in the depression process; and to implement the tactile sense control once, when the second operation process determination unit determines that the touch operation is the operation in the pushback process.

With the present configuration, the tactile feeling is applied in the depression process by one time, and the tactile feeling is applied in the pushback process by one time in response to the operation on the image of the switch device indicated on the display unit through the manipulated surface of the touch operation unit. Therefore, the operation feeling (click feeling) can be applied more precisely at the time of switch device operation.

The operation detection unit may be further configured to detect the touch position on the manipulated surface. In this case, the first operation process determination unit and the second operation process determination unit may be further configured to determine whether the touch operation is the operation in the depression process or the operation in the pushback process, according to change in the contact area in the manipulated surface specified by the touch position detected with the operation detection unit.

The contact area between the finger and the manipulated surface increases gradually in the process in which the switch device is depressed. To the contrary, the contact area between the finger and the manipulated surface decreases gradually in the process in which the switch device is pushed back. That is, change occurs in the contact area in the operation of the depressing process of the switch device, and in the operation of the pushback process of the switch device. In the present example, it is determined whether the touch operation is the operation in the depression process or the operation in the pushback process according to the change in the contact area. Therefore, the determination can be made correctly.

The operation detection unit may be further configured to detect the capacitance caused between the electrode located on the manipulated surface side and a user's finger thereby to detect the touch operation on the manipulated surface. In this case, the first operation process determination unit and the second operation process determination unit may be further configured to determine whether the touch operation is the operation in the depression process or the operation in the pushback process, according to the change in the capacitance detected with the operation detection unit.

In the present configuration, the operation detection unit may be a capacitance-detective touch sensor. In such a capacitance-detective touch sensor, as the contact area between the finger and the manipulated surface increases in the depression process of the switch device, the capacitance also increases with increase in the contact area. To the contrary, as the contact area between the finger and the manipulated surface decreases in the pushback process of the switch device, the capacitance also decreases with decrease in the contact area. In consideration of this, it may be determined whether the touch operation is the operation in the depression process or the operation in the pushback process according to the change in the capacitance.

The operation input device may further include: the depression force detection unit configured to detect the depression force at the time of the touch operation on the manipulated surface. In this case, the first operation process determination unit and the second operation process determination unit may be further configured to determine whether the touch operation is the operation in the depression process or the operation in the pushback process, according to the change in the depression force detected with the depression force detection unit.

In the process, in which the switch device is depressed, the user intends to depress the switch device, and therefore, it is conceivable that the depression force applied to the manipulated surface increases. To the contrary, in the process, in which the switch device is pushed back, it is conceivable that the depression force applied to the manipulated surface decreases. In consideration of this, it may be determined whether the touch operation is the operation in the depression process or the operation in the pushback process according to the change in the depression force applied to the manipulated surface.

The above processings such as calculations and determinations are not limited being executed by the control unit 11. The control unit may have various structures including the control unit 11 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An operation input device comprising:
    a touch operation unit having a manipulated surface configured to accept a touch operation;
    an operation detection unit configured to detect a touch operation on the manipulated surface;
    a moving unit configured to move the touch operation unit;
    a movement parameter storage unit storing a plurality of touch modes and a plurality of movement parameters, wherein a given touch mode is associated with a given movement parameter and each of the plurality of touch modes is associated with a different movement parameter; and
    a movement control unit configured to drive the moving unit to control a movement of the touch operation unit when the operation detection unit detects the touch operation and to drive the moving unit based on a selected touch mode from among the plurality of touch modes, wherein:
    the movement control unit is configured to control the movement of the touch operation unit through the moving unit in a manner that satisfies a predetermined stimulable condition, which enables stimulation of a skin sensory receptor, upon detection of the touch operation with the operation detection unit; and
    the predetermined stimulable condition includes all of the followings:
        a movement quantity of the touch operation unit is greater than or equal to 10 µm and is less than or equal to 200 µm; and
        a moving speed of the touch operation unit is greater than or equal to 0.025 µm/µs.

2. The operation input device according to claim 1, wherein the moving unit is further configured to move the touch operation unit in a horizontal direction of the manipulated surface.

3. The operation input device according to claim 1, further comprising:
    a condition configuration unit configured to set one of a plurality of distinct stimulable conditions, wherein
    the movement control unit is further configured to control a movement of the touch operation unit with the stimulable condition being set by the condition configuration unit.

4. The operation input device according to claim 1, wherein the movement control unit is further configured to implement a tactile sense control, which is to move the touch operation unit with the stimulable condition being constant, one time or a plurality of times.

5. The operation input device according to claim 4, wherein the moving unit is further configured:
    to invert a moving direction of the touch operation unit;
    to implement a with-tactile feeling control of the touch operation unit to satisfy the stimulable condition; and
    to implement a non-tactile feeling control of the touch operation unit not to satisfy the stimulable condition, and
    the tactile sense control includes, in one time, a combination of:
        the with-tactile feeling control, one time, with the stimulable condition being constant; and
        the non-tactile feeling control, one time or a plurality of times, in a moving direction being inverted relative to the moving direction of the touch operation unit in the with-tactile feeling control.

6. The operation input device according to claim 5, wherein the movement control unit is further configured to implement the tactile sense control such that, a movement quantity of the touch operation unit in the with-tactile feeling control is the same as a movement quantity of the touch operation unit in the non-tactile feeling control.

7. The operation input device according to claim 5, wherein the moving unit is further configured to move the touch operation unit in a first direction and a second direction, which are opposite to each other,
    the touch operation unit is located at an initial position when the tactile sense control is started,
    the touch operation unit approaches a first movement region when moving in
    the first direction relative to the initial position as reference,
    the touch operation unit approaches a second movement region when moving in the second direction relative to the initial position as reference, and
    the movement control unit is further configured to implement the tactile sense control:
        first to implement the non-tactile feeling control once toward the first movement region;
        subsequently to invert the moving direction of the touch operation unit and to implement the with-tactile feeling control once from the first movement region toward the second movement region; and subsequently to invert the moving direction of the touch operation unit and to implement the non-tactile feeling control once from the second movement region toward the initial position.

8. The operation input device according to claim 5, wherein the moving unit is further configured to move the touch operation unit in a first direction and a second direction, which are opposite to each other, the touch operation unit is located at an initial position when the tactile sense control is started, the touch operation unit approaches a first movement region when moving in the first direction relative to the initial position as reference, the touch operation unit approaches a second movement region when moving in the second direction relative to the initial position as reference, the movement control unit is further configured to implement the tactile sense control:

first to implement the with-tactile feeling control once toward one of the first movement region and the second movement region, and subsequently to invert the moving direction of the touch operation unit and to implement the non-tactile feeling control once toward the initial position; or first to implement the non-tactile feeling control once toward one of the first movement region and the second movement region, and subsequently to invert the moving direction of the touch operation unit and to implement the with-tactile feeling control once toward the initial position.

9. The operation input device according to claim 4, wherein the movement control unit is further configured to implement a movement control of the touch operation unit, which satisfies the stimulable condition, as a with-tactile feeling control of the touch operation unit, and the movement control unit is further configured to execute the with-tactile feeling control, which satisfies the stimulable condition that is kept constant, only once every time the movement control unit executes the tactile sense control.

10. The operation input device according to claim 9, wherein the moving unit is configured to invert the moving direction of the touch operation unit, and the movement control unit is further configured:

to invert the moving direction of the touch operation unit in a previous tactile sense control; and to implement a present tactile sense control.

11. The operation input device according to claim 4, wherein the manipulated surface is associated with a screen of a display unit configured to indicate an image of a switch device for accepting a depression operation, the operation detection unit is further configured to detect a touch position on the manipulated surface, the movement control unit includes a boundary position determination unit configured to determine whether the touch position detected with the operation detection unit is a boundary position corresponding to a boundary of the image of the switch device, and the movement control unit further includes a boundary movement control unit configured to implement the tactile sense control, when the boundary position determination unit determines that the touch position is on the boundary position, in a tracing operation in which the touch position detected with the operation detection unit changes continuously.

12. The operation input device according to claim 4, wherein the manipulated surface is associated with a screen of a display unit configured to indicate an image of a switch device for accepting a depression operation, the operation detection unit is further configured to detect a touch position on the manipulated surface, the movement control unit further includes a center position determination unit configured to determine whether the touch position detected with the operation detection unit is a center position corresponding to a center of the image of the switch device, and the movement control unit further includes a center movement control unit configured to implement the tactile sense control when the center position determination unit determines that the touch position is the center position in the tracing operation.

13. The operation input device according to claim 12, wherein the movement control unit includes a boundary position determination unit configured to determine whether the touch position detected with the operation detection unit is a boundary position corresponding to a boundary of the image of the switch device, and the movement control unit further includes a boundary movement control unit configured to implement the tactile sense control, when the boundary position determination unit determines that the touch position is on the boundary position, in a tracing operation in which the touch position detected with the operation detection unit changes continuously.

14. The operation input device according to claim 4, wherein the manipulated surface is associated with a screen of a display unit configured to indicate an image of a switch device for accepting a depression operation, the movement control unit further includes a first operation process determination unit configured to determine whether a touch operation on the manipulated surface is an operation in a depression process relative to the switch device, and the movement control unit further includes a second operation process determination unit configured to determine whether a touch operation on the manipulated surface is an operation in a pushback process relative to the switch device, subsequent to the operation in the depression process, and the movement control unit is further configured:

to implement the tactile sense control once, when the first operation process determination unit determines that the touch operation is the operation in the depression process; and to implement the tactile sense control once, when the second operation process determination unit determines that the touch operation is the operation in the pushback process.

15. The operation input device according to claim 14, wherein the operation detection unit is further configured to detect a touch position on the manipulated surface, and the first operation process determination unit and the second operation process determination unit are further configured to determine whether the touch operation is the operation in the depression process or the operation in the pushback process, according to a change in a contact area in the manipulated surface specified by the touch position detected with the operation detection unit.

16. The operation input device according to claim 14, wherein
the operation detection unit is further configured to detect a capacitance between an electrode located at a manipulated surface and a user's finger thereby to detect a touch operation on the manipulated surface, and
the first operation process determination unit and the second operation process determination unit are further configured to determine whether the touch operation is the operation in the depression process or the operation in the pushback process, according to a change in the capacitance detected with the operation detection unit.

17. The operation input device according to claim 14, further comprising:
a depression force detection unit configured to detect a depression force in the touch operation on the manipulated surface, wherein
the first operation process determination unit and the second operation process determination unit are further configured to determine whether the touch operation is the operation in the depression process or the operation in the pushback process, according to a change in the depression force detected with the depression force detection unit.

18. The operation input device according to claim 1, wherein the movement quantity of the touch operation unit is greater than or equal to 10 μm and is less than or equal to 100 μm.

19. The operation input device according to claim 1, wherein each of the plurality of movement parameters includes a combination of a movement quantity and a moving speed of the touch operation unit, and the combination of the movement quantity and the moving speed of the touch operation unit is different for each of the plurality of touch modes.

20. A method for controlling an operation input device, the method comprising:
storing a plurality of touch modes and a plurality of movement parameters, wherein a given touch mode is associated with a given movement parameter and each of the plurality of touch modes is associated with a different movement parameter;
detecting a touch operation implemented on a manipulated surface of the operation input device; and
driving, on detection of a touch operation in the detecting, a moving unit of the operation input device to move the touch operation unit and to control a movement of the touch operation unit to satisfy a predetermined stimulable condition enabling stimulation of a skin sensory receptor, wherein the moving unit is moved based on a selected touch mode from among the plurality of touch modes and the predetermined stimulable condition includes all of the followings:
a movement quantity of the touch operation unit is greater than or equal to 10 μm and is less than or equal to 200 μm; and
a moving speed of the touch operation unit is greater than or equal to 0.025 μm/μs.

21. A non-transitory computer readable medium comprising instructions executed by a computer, the instructions including the method according to claim 20.

22. The method according to claim 20, wherein the movement quantity of the touch operation unit is greater than or equal to 10 μm and is less than or equal to 100 μm.

23. The method according to claim 20, wherein each of the plurality of movement parameters includes a combination of a movement quantity and a moving speed of the touch operation unit, and the combination of the movement quantity and the moving speed of the touch operation unit is different for each of the plurality of touch modes.

* * * * *